(12) United States Patent
Thompson et al.

(10) Patent No.: US 10,727,894 B2
(45) Date of Patent: Jul. 28, 2020

(54) FRONT END SYSTEMS WITH SWITCHED TERMINATION FOR ENHANCED INTERMODULATION DISTORTION PERFORMANCE

(71) Applicant: Skyworks Solutions, Inc., Irvine, CA (US)

(72) Inventors: Robert John Thompson, Cedar Rapids, IA (US); Timothy M. Faughn, Cedar Rapids, IA (US); Jonathan Christian Crandall, Marion, IA (US)

(73) Assignee: Skyworks Solutions, Inc., Irvine, CA (US)

( * ) Notice: Subject to any disclaimer, the term of this patent is extended or adjusted under 35 U.S.C. 154(b) by 0 days.

(21) Appl. No.: 16/393,109

(22) Filed: Apr. 24, 2019

(65) Prior Publication Data

US 2019/0334573 A1 Oct. 31, 2019

Related U.S. Application Data

(60) Provisional application No. 62/664,588, filed on Apr. 30, 2018.

(51) Int. Cl.
*H04B 1/44* (2006.01)
*H04M 1/00* (2006.01)
*H04L 5/14* (2006.01)

(52) U.S. Cl.
CPC .............. *H04B 1/44* (2013.01); *H04L 5/14* (2013.01)

(58) Field of Classification Search
CPC ........ H04B 1/04; H04B 1/005; H04B 1/0053; H04B 1/0057; H04B 1/006; H04B 1/0458;
(Continued)

(56) References Cited

U.S. PATENT DOCUMENTS 7,035,602 B2 * 4/2006 Satoh ..................... H01P 1/15
455/118
8,620,244 B2 * 12/2013 Roeckl ................... H04B 1/18
455/553.1

(Continued)

OTHER PUBLICATIONS

International Search Report and Written Opinion for International Application No. PCT/US2019/028972 dated Oct. 18, 2019 in 16 pages.

*Primary Examiner* — Quochien B Vuong
(74) *Attorney, Agent, or Firm* — Knobbe, Martens, Olson & Bear, LLP

(57) ABSTRACT

Front end systems with switched termination for enhanced intermodulation distortion performance are provided herein. The switched termination can be used on transmit paths and/or receive paths of the front end system to suppress impedance variation when the signal paths are inactive. For example, with respect to switched termination for transmit paths, a front end system can include a frequency multiplexing circuit connected to a band switch by a first radio frequency (RF) signal path and by a second RF signal path. The band switch selectively provides the frequency multiplexing circuit with a first transmit signal over the first RF signal path and with a second transmit signal over the second RF signal path. The front end system further includes a switched termination circuit in shunt with the first RF signal path and operable to turn on to suppress impedance variation when the first RF signal path is inactive.

20 Claims, 15 Drawing Sheets

(58) Field of Classification Search
CPC .......... H04B 1/0475; H04B 1/16; H04B 1/40; H04B 1/44; H04B 1/48; H04B 1/406; H04M 11/062; H04W 88/06
USPC ... 455/63.1, 67.13, 73, 78, 80, 83, 295, 296, 455/552.1, 553.1
See application file for complete search history.

(56) References Cited

U.S. PATENT DOCUMENTS

| | | | |
|---|---|---|---|
| 9,263,793 B2 * | 2/2016 | Dupuy | H01Q 1/50 |
| 9,531,413 B2 * | 12/2016 | Sun | H04B 1/0475 |
| 9,941,582 B2 * | 4/2018 | Hayakawa | H01Q 1/48 |
| 10,128,872 B2 * | 11/2018 | Langer | H04W 72/0453 |
| 2013/0029619 A1 | 1/2013 | Zhang et al. | |
| 2013/0113575 A1 | 5/2013 | Easter | |
| 2013/0148636 A1 | 6/2013 | Lum et al. | |
| 2013/0293316 A1 | 11/2013 | Kitching et al. | |
| 2015/0171799 A1 | 6/2015 | Zhang et al. | |
| 2016/0013758 A1 | 1/2016 | Cao et al. | |
| 2016/0043456 A1 | 2/2016 | Easter | |
| 2016/0049910 A1 | 2/2016 | Datta et al. | |
| 2016/0172738 A1 | 6/2016 | Srirattana et al. | |
| 2016/0172739 A1 | 6/2016 | Srirattana et al. | |
| 2016/0380594 A1 | 12/2016 | Sun et al. | |
| 2016/0380603 A1 | 12/2016 | Zhang et al. | |
| 2017/0040958 A1 | 2/2017 | Cao et al. | |
| 2017/0077967 A1 | 3/2017 | Srirattana et al. | |
| 2017/0230075 A1 | 8/2017 | Sun et al. | |
| 2018/0041204 A1 | 2/2018 | Zhu et al. | |
| 2018/0048345 A1 | 2/2018 | Pehlke et al. | |
| 2018/0145636 A1 | 5/2018 | Datta et al. | |

* cited by examiner

FREQ (1.710GHz TO 1.785GHz)

FREQ (1.710GHz TO 1.785GHz)

FRONT END SYSTEMS WITH SWITCHED TERMINATION FOR ENHANCED INTERMODULATION DISTORTION PERFORMANCE

CROSS-REFERENCE TO RELATED APPLICATIONS

This application claims the benefit of priority under 35 U.S.C. § 119 of U.S. Provisional Patent Application No. 62/664,588, filed Apr. 30, 2018, and entitled "FRONT END SYSTEMS WITH SWITCHED TERMINATION FOR ENHANCED INTERMODULATION DISTORTION PERFORMANCE," which is herein incorporated by reference in its entirety.

BACKGROUND

Field

Embodiments of the invention relate to electronic systems, and in particular, to radio frequency electronics.

Description of Related Technology

Radio frequency (RF) communication systems can be used for transmitting and/or receiving signals of a wide range of frequencies. For example, an RF communication system can be used to wirelessly communicate RF signals in a frequency range of about 30 kHz to 300 GHz, such as in the range of about 450 MHz to about 7 GHz for certain communications standards.

Examples of RF communication systems include, but are not limited to, mobile phones, tablets, base stations, network access points, customer-premises equipment (CPE), laptops, and wearable electronics.

SUMMARY

In certain embodiments, the present disclosure relates to a front end system. The front end system includes a frequency multiplexing circuit, a band switch configured to selectively provide the frequency multiplexing circuit with a first transmit signal over a first radio frequency signal path and with a second transmit signal over a second radio frequency signal path, and a first switched termination circuit in shunt with the first radio frequency signal path and operable to turn on to suppress impedance variation when the first radio frequency signal path is inactive.

In some embodiments, the front end system further includes a second switched termination circuit in shunt with the second radio frequency signal path and operable to turn on to suppress impedance variation when the second radio frequency signal path is inactive.

In a number of embodiments, the front end system further includes an antenna switch coupled to the frequency multiplexing circuit at a node, and the first switched termination circuit is operable to maintain impedance matching at the node over a signal frequency range of the first transmit signal.

In various embodiments, the frequency multiplexing circuit is further configured to output a first receive signal and a second receive signal.

In some embodiments, the first transmit signal is a band 1 signal and the second transmit signal is a band 3 signal.

In a number of embodiments, the first transmit signal is a band 3 signal and the second transmit signal is a band 1 signal.

In several embodiments, the frequency multiplexing circuit includes at least one duplexer.

In various embodiments, the frequency multiplexing circuit includes at least one quadplexer.

In some embodiments, the band switch provides the first radio frequency signal at an output terminal, and the front end system further includes a grounding switch electrically connected between the output terminal and ground. According to a number of embodiments, the front end system further includes a decoupling switch electrically connected between the output terminal of the band switch and the first switched termination circuit.

In various embodiments, the first switched termination circuit includes a shunt switch and a termination resistor electrically connected in series. According to a number of embodiments, the termination resistor has a resistance of about fifty ohms.

In several embodiments, the band switch is further configured to selectively provide the frequency multiplexing circuit with a third transmit signal over a third radio frequency signal path.

In some embodiments, the front end system further includes a power amplifier configured to provide the band switch with the first transmit signal and the second transmit signal at an input terminal to the band switch.

In certain embodiments, the present disclosure relates to a mobile device. The mobile device includes a transceiver configured to generate at least one radio frequency signal, and a front end system configured to process the at least one radio frequency signal from the transceiver to generate a first transmit signal and a second transmit signal. The front end system includes a frequency multiplexing circuit and a band switch configured to selectively provide the frequency multiplexing circuit with the first transmit signal over a first radio frequency signal path and with the second transmit signal over a second radio frequency signal path. The front end system further includes a first switched termination circuit in shunt with the first radio frequency signal path and operable to turn on to suppress impedance variation when the first radio frequency signal path is inactive.

In some embodiments, the front end system further includes a second switched termination circuit in shunt with the second radio frequency signal path and operable to turn on to suppress impedance variation when the second radio frequency signal path is inactive.

In a number of embodiments, the front end system further includes an antenna switch coupled to the frequency multiplexing circuit at a node, and the first switched termination circuit is operable to maintain impedance matching at the node over a signal frequency range of the first transmit signal. According to various embodiments, the mobile device further includes a first antenna, and the antenna switch is operable to selectively connect the node to the first antenna.

In several embodiments, the front end system further includes at least one power amplifier configured to generate the first transmit signal and the second transmit signal.

In some embodiments, the band switch provides the first radio frequency signal at an output terminal, and the front end system further includes a grounding switch electrically connected between the output terminal and ground. According to a number of embodiments, the front end system further includes a decoupling switch electrically connected between the output terminal of the band switch and the first switched termination circuit.

In certain embodiments, the present disclosure relates to a method of radio frequency signal communication. The method includes controlling a state of a band switch to provide a first transmit signal to a frequency multiplexing circuit over a first radio frequency signal path, changing the state of the band switch to deactivate the first radio frequency signal path and to provide a second transmit signal to the frequency multiplexing circuit over a second radio frequency signal path, and turning on a first switched termination circuit in shunt to the first radio frequency signal path to suppress impedance variation when the first radio frequency signal path is deactivated.

In a number of embodiments, the method further includes maintaining impedance matching at a node between the frequency multiplexing circuit and an antenna switch over a signal frequency range of the first transmit signal.

In certain embodiments, the present disclosure relates to a front end system. The front end system includes a frequency multiplexing circuit, a first low noise amplifier electrically connected to the frequency multiplexing circuit over a first radio frequency signal path, a second low noise amplifier electrically connected to the frequency multiplexing circuit over a second radio frequency signal path, and a first switched termination circuit in shunt with the first radio frequency signal path and operable to turn on to suppress impedance variation when the first low noise amplifier is inactive.

In some embodiments, the front end system further includes a second switched termination circuit in shunt with the second radio frequency signal path and operable to turn on to suppress impedance variation when the second low noise amplifier is inactive.

In several embodiments, the front end system further includes an antenna switch coupled to the frequency multiplexing circuit at a node, and the first switched termination circuit is operable to maintain impedance matching at the node over a signal frequency range of a radio frequency signal amplified by the first low noise amplifier.

In a number of embodiments, the frequency multiplexing circuit includes at least one duplexer.

In various embodiments, the front end system further includes a grounding switch electrically connected between an input terminal of the first low noise amplifier and ground. According to several embodiments, the front end system further includes a decoupling switch electrically connected between the input terminal of the first low noise amplifier and the first switched termination circuit.

In some embodiments, the first switched termination circuit includes a shunt switch and a termination resistor electrically connected in series. According to various embodiments, the termination resistor has a resistance of about fifty ohms.

In certain embodiments, the present disclosure relates to a mobile device. The mobile device includes an antenna, and a front end system electrically coupled to the antenna. The front end system includes a frequency multiplexing circuit, a first low noise amplifier electrically connected to the frequency multiplexing circuit over a first radio frequency signal path, a second low noise amplifier electrically connected to the frequency multiplexing circuit over a second radio frequency signal path, and a first switched termination circuit in shunt with the first radio frequency signal path and operable to turn on to suppress impedance variation when the first low noise amplifier is inactive.

In some embodiments, the front end system further includes a second switched termination circuit in shunt with the second radio frequency signal path and operable to turn on to suppress impedance variation when the second low noise amplifier is inactive. According to a number of embodiments, the front end system further includes an antenna switch coupled to the frequency multiplexing circuit at a node, and the first switched termination circuit is operable to maintain impedance matching at the node over a signal frequency range of a radio frequency signal amplified by the first low noise amplifier.

In various embodiments, the frequency multiplexing circuit includes at least one duplexer.

In some embodiments, the front end system further includes a grounding switch electrically connected between an input terminal of the first low noise amplifier and ground. According to a number of embodiments, the front end system further includes decoupling switch electrically connected between the input terminal of the first low noise amplifier and the first switched termination circuit.

In several embodiments, the first switched termination circuit includes a shunt switch and a termination resistor electrically connected in series. In accordance with various embodiments, the termination resistor has a resistance of about fifty ohms.

In certain embodiments, the present disclosure relates to a method of radio frequency signal communication. The method includes providing a first receive signal from a frequency multiplexing circuit to a first low noise amplifier over a first radio frequency signal path, providing a second receive signal from the frequency multiplexing circuit to a second low noise amplifier over a second radio frequency signal path, and turning on a first switched termination circuit in shunt to the first radio frequency signal path to suppress impedance variation when the first low noise amplifier is deactivated.

In some embodiments, the method further includes maintaining impedance matching at a node between the frequency multiplexing circuit and an antenna switch over a signal frequency range of the first receive signal.

In various embodiments, the method further includes grounding an input terminal of the first low noise amplifier using a grounding switch when the first low noise amplifier is deactivated. According to several embodiments, the method further includes decoupling the input terminal of the first low noise amplifier and the first switched termination circuit using a decoupling switch when the first low noise amplifier is deactivated.

In certain embodiments, the present disclosure relates to a front end system. The front end system includes a frequency multiplexing circuit, a receive switch configured to receive a first receive signal from the frequency multiplexing circuit over a first radio frequency signal path and to receive a second receive signal from the frequency multiplexing circuit over a second radio frequency signal path, and a first switched termination circuit in shunt with the first radio frequency signal path and operable to turn on to suppress impedance variation when the first radio frequency signal path is inactive.

In several embodiments, the front end system further includes a second switched termination circuit in shunt with the second radio frequency signal path and operable to turn on to suppress impedance variation when the second radio frequency signal path is inactive.

In some embodiments, the front end system further includes an antenna switch coupled to the frequency multiplexing circuit at a node, and the first switched termination circuit is operable to maintain impedance matching at the node over a signal frequency range of the first receive signal.

In various embodiments, the frequency multiplexing circuit includes at least one duplexer.

In several embodiments, the front end system further includes a grounding switch electrically connected between an input terminal of the receive switch and ground. According to a number of embodiments, the front end system further includes a decoupling switch electrically connected between the input terminal of the first low noise amplifier and the first switched termination circuit.

In some embodiments, the first switched termination circuit includes a shunt switch and a termination resistor electrically connected in series. According to various embodiments, the termination resistor has a resistance of about fifty ohms.

In certain embodiments, the present disclosure relates to a mobile device. The mobile device includes an antenna, and a front end system electrically coupled to the antenna. The front end system includes a frequency multiplexing circuit, a receive switch configured to receive a first receive signal from the frequency multiplexing circuit over a first radio frequency signal path and to receive a second receive signal from the frequency multiplexing circuit over a second radio frequency signal path, and a first switched termination circuit in shunt with the first radio frequency signal path and operable to turn on to suppress impedance variation when the first radio frequency signal path is inactive.

In some embodiments, the front end system further includes a second switched termination circuit in shunt with the second radio frequency signal path and operable to turn on to suppress impedance variation when the second radio frequency signal path is inactive.

In a number of embodiments, the front end system further includes an antenna switch coupled to the frequency multiplexing circuit at a node, and the first switched termination circuit is operable to maintain impedance matching at the node over a signal frequency range of a radio frequency signal amplified by the first low noise amplifier.

In various embodiments, the frequency multiplexing circuit includes at least one duplexer.

In several embodiments, the front end system further includes a grounding switch electrically connected between an input terminal of the receive switch and ground. According to a number of embodiments, the front end system further includes a decoupling switch electrically connected between the input terminal and the first switched termination circuit.

In some embodiments, the first switched termination circuit includes a shunt switch and a termination resistor electrically connected in series. According to a number of embodiments, the termination resistor has a resistance of about fifty ohms.

In certain embodiments, the present disclosure relates to a method of radio frequency signal communication. The method includes providing a first receive signal from a frequency multiplexing circuit to a receive switch over a first radio frequency signal path, providing a second receive signal from the frequency multiplexing circuit to the receive switch over a second radio frequency signal path, and turning on a first switched termination circuit in shunt to the first radio frequency signal path to suppress impedance variation when the first radio frequency signal path is deactivated.

In some embodiments, the method further includes maintaining impedance matching at a node between the frequency multiplexing circuit and an antenna switch over a signal frequency range of the first receive signal.

In various embodiments, the method further includes grounding an input terminal of the receive switch using a grounding switch when the first radio frequency signal path is deactivated. According to several embodiments, the method further includes decoupling the input terminal of the receive switch and the first switched termination circuit using a decoupling switch when the first radio frequency signal path is deactivated.

DETAILED DESCRIPTION OF EMBODIMENTS

Figure 1:
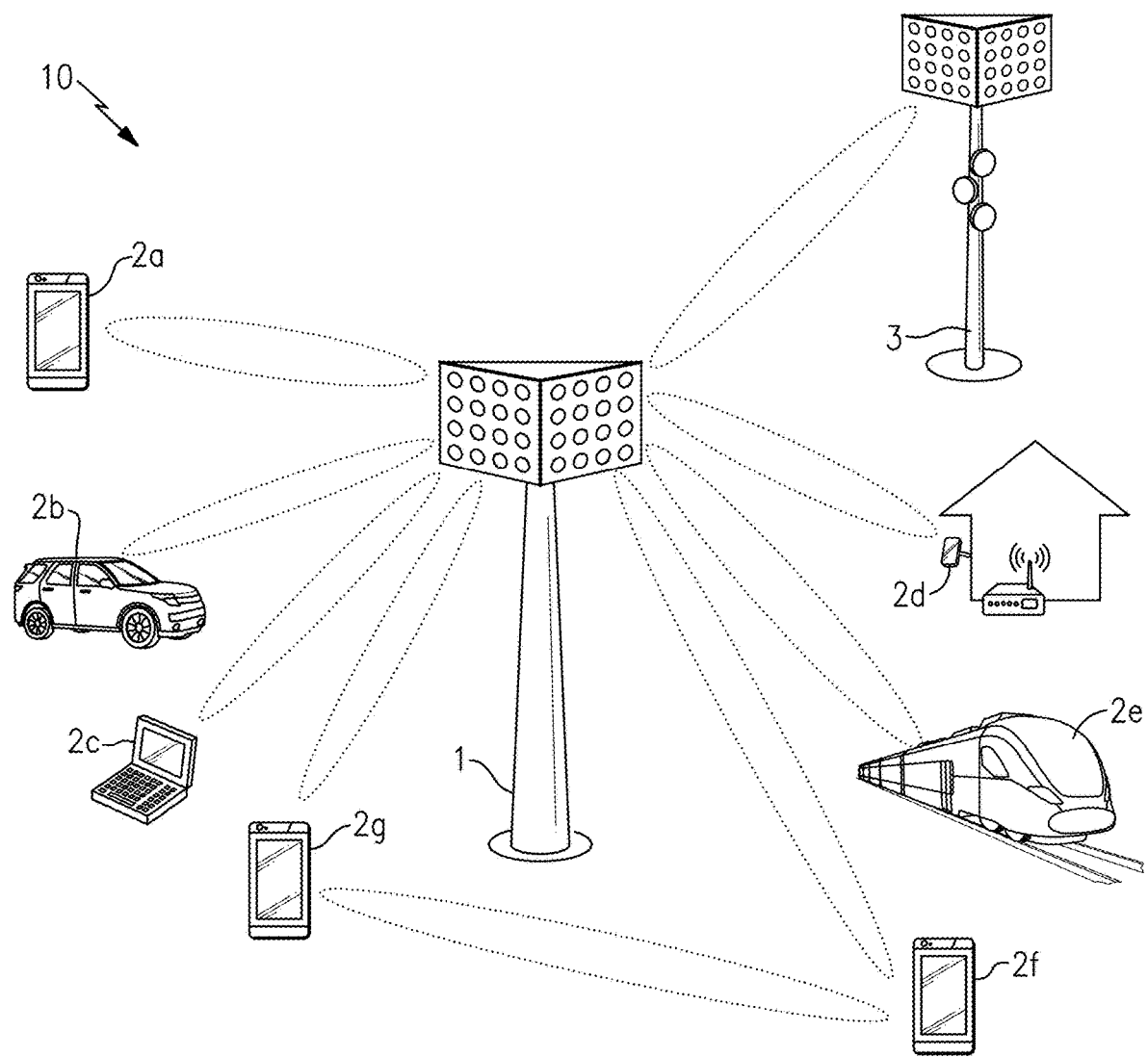
FIG. 1 is a schematic diagram of one example of a communication network.

The following detailed description of certain embodiments presents various descriptions of specific embodiments. However, the innovations described herein can be embodied in a multitude of different ways, for example, as defined and covered by the claims. In this description, reference is made to the drawings where like reference numerals can indicate identical or functionally similar elements. It will be understood that elements illustrated in the figures are not necessarily drawn to scale. Moreover, it will be understood that certain embodiments can include more elements than illustrated in a drawing and/or a subset of the elements illustrated in a drawing. Further, some embodiments can incorporate any suitable combination of features from two or more drawings.

The International Telecommunication Union (ITU) is a specialized agency of the United Nations (UN) responsible for global issues concerning information and communication technologies, including the shared global use of radio spectrum.

The 3rd Generation Partnership Project (3GPP) is a collaboration between groups of telecommunications standard bodies across the world, such as the Association of Radio Industries and Businesses (ARIB), the Telecommunications Technology Committee (TTC), the China Communications Standards Association (CCSA), the Alliance for Telecommunications Industry Solutions (ATIS), the Telecommunications Technology Association (TTA), the European Telecommunications Standards Institute (ETSI), and the Telecommunications Standards Development Society, India (TSDSI).

Working within the scope of the ITU, 3GPP develops and maintains technical specifications for a variety of mobile communication technologies, including, for example, second generation (2G) technology (for instance, Global System for Mobile Communications (GSM) and Enhanced Data Rates for GSM Evolution (EDGE)), third generation (3G) technology (for instance, Universal Mobile Telecommunications System (UMTS) and High Speed Packet Access (HSPA)), and fourth generation (4G) technology (for instance, Long Term Evolution (LTE) and LTE-Advanced).

The technical specifications controlled by 3GPP can be expanded and revised by specification releases, which can span multiple years and specify a breadth of new features and evolutions.

In one example, 3GPP introduced carrier aggregation (CA) for LTE in Release 10. Although initially introduced with two downlink carriers, 3GPP expanded carrier aggregation in Release 14 to include up to five downlink carriers and up to three uplink carriers. Other examples of new features and evolutions provided by 3GPP releases include, but are not limited to, License Assisted Access (LAA), enhanced LAA (eLAA), Narrowband Internet of things (NB-IOT), Vehicle-to-Everything (V2X), and High Power User Equipment (HPUE).

3GPP introduced Phase 1 of fifth generation (5G) technology in Release 15, and plans to introduce Phase 2 of 5G technology in Release 16 (targeted for 2019). Subsequent 3GPP releases will further evolve and expand 5G technology. 5G technology is also referred to herein as 5G New Radio (NR).

5G NR supports or plans to support a variety of features, such as communications over millimeter wave spectrum, beamforming capability, high spectral efficiency waveforms, low latency communications, multiple radio numerology, and/or non-orthogonal multiple access (NOMA). Although such RF functionalities offer flexibility to networks and enhance user data rates, supporting such features can pose a number of technical challenges.

The teachings herein are applicable to a wide variety of communication systems, including, but not limited to, communication systems using advanced cellular technologies, such as LTE-Advanced, LTE-Advanced Pro, and/or 5G NR.

FIG. 1 is a schematic diagram of one example of a communication network 10. The communication network 10 includes a macro cell base station 1, a small cell base station 3, and various examples of user equipment (UE), including a first mobile device 2a, a wireless-connected car 2b, a laptop 2c, a stationary wireless device 2d, a wireless-connected train 2e, a second mobile device 2f, and a third mobile device 2g.

Although specific examples of base stations and user equipment are illustrated in FIG. 1, a communication network can include base stations and user equipment of a wide variety of types and/or numbers.

For instance, in the example shown, the communication network 10 includes the macro cell base station 1 and the small cell base station 3. The small cell base station 3 can operate with relatively lower power, shorter range, and/or with fewer concurrent users relative to the macro cell base station 1. The small cell base station 3 can also be referred to as a femtocell, a picocell, or a microcell. Although the communication network 10 is illustrated as including two base stations, the communication network 10 can be implemented to include more or fewer base stations and/or base stations of other types.

Although various examples of user equipment are shown, the teachings herein are applicable to a wide variety of user equipment, including, but not limited to, mobile phones, tablets, laptops, IoT devices, wearable electronics, customer premises equipment (CPE), wireless-connected vehicles, wireless relays, and/or a wide variety of other communication devices. Furthermore, user equipment includes not only currently available communication devices that operate in a cellular network, but also subsequently developed communication devices that will be readily implementable with the inventive systems, processes, methods, and devices as described and claimed herein.

The illustrated communication network 10 of FIG. 1 supports communications using a variety of cellular technologies, including, for example, 4G LTE and 5G NR. In certain implementations, the communication network 10 is further adapted to provide a wireless local area network (WLAN), such as WiFi. Although various examples of communication technologies have been provided, the communication network 10 can be adapted to support a wide variety of communication technologies.

Various communication links of the communication network 10 have been depicted in FIG. 1. The communication links can be duplexed in a wide variety of ways, including, for example, using frequency-division duplexing (FDD) and/or time-division duplexing (TDD). FDD is a type of radio frequency communications that uses different frequencies for transmitting and receiving signals. FDD can provide a number of advantages, such as high data rates and low latency. In contrast, TDD is a type of radio frequency communications that uses about the same frequency for transmitting and receiving signals, and in which transmit and receive communications are switched in time. TDD can provide a number of advantages, such as efficient use of spectrum and variable allocation of throughput between transmit and receive directions.

In certain implementations, user equipment can communicate with a base station using one or more of 4G LTE, 5G NR, and WiFi technologies. In certain implementations, enhanced license assisted access (eLAA) is used to aggregate one or more licensed frequency carriers (for instance, licensed 4G LTE and/or 5G NR frequencies), with one or more unlicensed carriers (for instance, unlicensed WiFi frequencies).

As shown in FIG. 1, the communication links include not only communication links between UE and base stations, but also UE to UE communications and base station to base station communications. For example, the communication network 10 can be implemented to support self-fronthaul and/or self-backhaul.

The communication links can operate over a wide variety of frequencies. In certain implementations, communications are supported using 5G NR technology over one or more frequency bands that are less than 6 Gigahertz (GHz) and/or over one or more frequency bands that are greater than 6 GHz. For example, the communication links can serve Frequency Range 1 (FR1), Frequency Range 2 (FR2), or a combination thereof. In one embodiment, one or more of the mobile devices support a HPUE power class specification.

In certain implementations, a base station and/or user equipment communicates using beamforming. For example, beamforming can be used to focus signal strength to overcome path losses, such as high loss associated with communicating over high signal frequencies. In certain embodiments, user equipment, such as one or more mobile phones, communicate using beamforming on millimeter wave frequency bands in the range of 30 GHz to 300 GHz and/or upper centimeter wave frequencies in the range of 6 GHz to 30 GHz, or more particularly, 24 GHz to 30 GHz.

Different users of the communication network 10 can share available network resources, such as available frequency spectrum, in a wide variety of ways.

In one example, frequency division multiple access (FDMA) is used to divide a frequency band into multiple frequency carriers. Additionally, one or more carriers are allocated to a particular user. Examples of FDMA include, but are not limited to, single carrier FDMA (SC-FDMA) and orthogonal FDMA (OFDMA). OFDMA is a multicarrier technology that subdivides the available bandwidth into multiple mutually orthogonal narrowband subcarriers, which can be separately assigned to different users.

Other examples of shared access include, but are not limited to, time division multiple access (TDMA) in which a user is allocated particular time slots for using a frequency resource, code division multiple access (CDMA) in which a frequency resource is shared amongst different users by assigning each user a unique code, space-divisional multiple access (SDMA) in which beamforming is used to provide shared access by spatial division, and non-orthogonal multiple access (NOMA) in which the power domain is used for multiple access. For example, NOMA can be used to serve multiple users at the same frequency, time, and/or code, but with different power levels.

Enhanced mobile broadband (eMBB) refers to technology for growing system capacity of LTE networks. For example, eMBB can refer to communications with a peak data rate of at least 10 Gbps and a minimum of 100 Mbps for each user. Ultra-reliable low latency communications (uRLLC) refers to technology for communication with very low latency, for instance, less than 2 milliseconds. uRLLC can be used for mission-critical communications such as for autonomous driving and/or remote surgery applications. Massive machine-type communications (mMTC) refers to low cost and low data rate communications associated with wireless connections to everyday objects, such as those associated with Internet of Things (IoT) applications.

The communication network 10 of FIG. 1 can be used to support a wide variety of advanced communication features, including, but not limited to, eMBB, uRLLC, and/or mMTC.

Figure 2A:
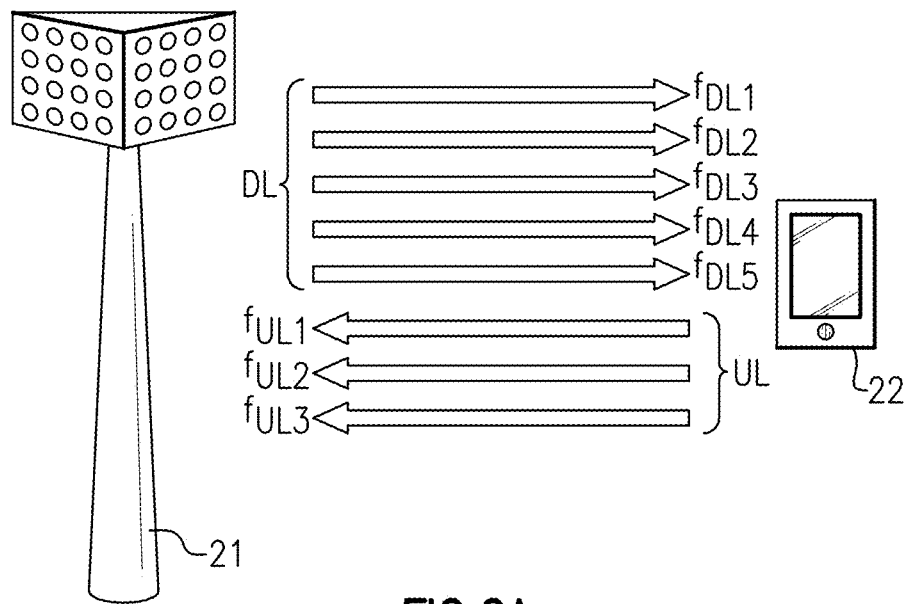
FIG. 2A is a schematic diagram of one example of a communication link using carrier aggregation.

FIG. 2A is a schematic diagram of one example of a communication link using carrier aggregation. Carrier aggregation can be used to widen bandwidth of the communication link by supporting communications over multiple frequency carriers, thereby increasing user data rates and enhancing network capacity by utilizing fragmented spectrum allocations.

In the illustrated example, the communication link is provided between a base station 21 and a mobile device 22.

As shown in FIG. 2A, the communications link includes a downlink channel used for RF communications from the base station 21 to the mobile device 22, and an uplink channel used for RF communications from the mobile device 22 to the base station 21.

Although FIG. 2A illustrates carrier aggregation in the context of FDD communications, carrier aggregation can also be used for TDD communications.

In certain implementations, a communication link can provide asymmetrical data rates for a downlink channel and an uplink channel. For example, a communication link can be used to support a relatively high downlink data rate to enable high speed streaming of multimedia content to a mobile device, while providing a relatively slower data rate for uploading data from the mobile device to the cloud.

In the illustrated example, the base station 21 and the mobile device 22 communicate via carrier aggregation, which can be used to selectively increase bandwidth of the communication link. Carrier aggregation includes contiguous aggregation, in which contiguous carriers within the same operating frequency band are aggregated. Carrier aggregation can also be non-contiguous, and can include carriers separated in frequency within a common band or in different bands.

In the example shown in FIG. 2A, the uplink channel includes three aggregated component carriers full, $f_{UL1}$, $f_{UL2}$, and $f_{UL3}$. Additionally, the downlink channel includes five aggregated component carriers $f_{DL1}$, $f_{DL2}$, $f_{DL3}$, $f_{DL4}$, and $f_{DL5}$. Although one example of component carrier aggregation is shown, more or fewer carriers can be aggregated for uplink and/or downlink. Moreover, a number of aggregated carriers can be varied over time to achieve desired uplink and downlink data rates.

For example, a number of aggregated carriers for uplink and/or downlink communications with respect to a particular mobile device can change over time. For example, the number of aggregated carriers can change as the device moves through the communication network and/or as network usage changes over time.

Figure 2B:
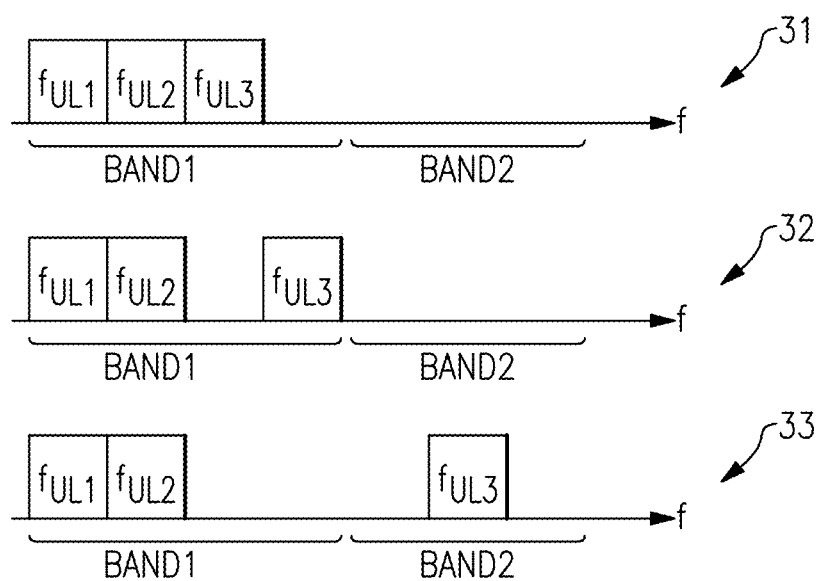
FIG. 2B illustrates various examples of uplink carrier aggregation for the communication link of FIG. 2A.

FIG. 2B illustrates various examples of uplink carrier aggregation for the communication link of FIG. 2A. FIG. 2B includes a first carrier aggregation scenario 31, a second carrier aggregation scenario 32, and a third carrier aggregation scenario 33, which schematically depict three types of carrier aggregation.

The carrier aggregation scenarios 31-33 illustrate different spectrum allocations for a first component carrier full, a second component carrier $f_{UL2}$, and a third component carrier $f_{UL3}$. Although FIG. 2B is illustrated in the context of aggregating three component carriers, carrier aggregation can be used to aggregate more or fewer carriers. Moreover, although illustrated in the context of uplink, the aggregation scenarios are also applicable to downlink.

The first carrier aggregation scenario 31 illustrates intra-band contiguous carrier aggregation, in which component carriers that are adjacent in frequency and in a common frequency band are aggregated. For example, the first carrier aggregation scenario 31 depicts aggregation of component carriers $f_{UL1}$, $f_{UL2}$, and $f_{UL3}$ that are contiguous and located within a first frequency band BAND1.

With continuing reference to FIG. 2B, the second carrier aggregation scenario 32 illustrates intra-band non-continuous carrier aggregation, in which two or more components carriers that are non-adjacent in frequency and within a common frequency band are aggregated. For example, the second carrier aggregation scenario 32 depicts aggregation of component carriers $f_{UL1}$, $f_{UL2}$, and $f_{UL3}$ that are non-contiguous, but located within a first frequency band BAND1.

The third carrier aggregation scenario 33 illustrates inter-band non-contiguous carrier aggregation, in which component carriers that are non-adjacent in frequency and in multiple frequency bands are aggregated. For example, the third carrier aggregation scenario 33 depicts aggregation of component carriers $f_{UL1}$ and $f_{UL2}$ of a first frequency band BAND1 with component carrier $f_{UL3}$ of a second frequency band BAND2.

Figure 2C:
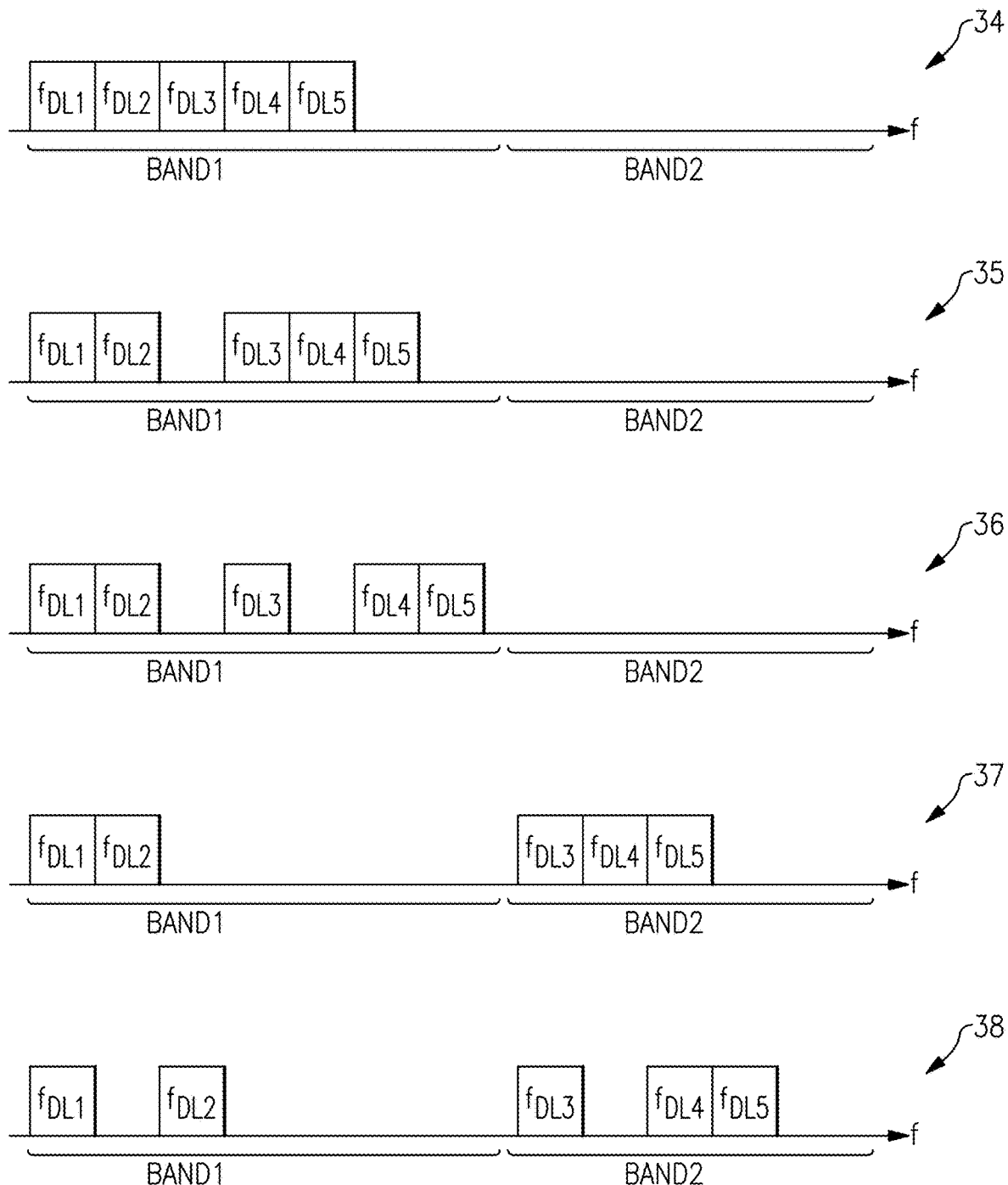
FIG. 2C illustrates various examples of downlink carrier aggregation for the communication link of FIG. 2A.

FIG. 2C illustrates various examples of downlink carrier aggregation for the communication link of FIG. 2A. The examples depict various carrier aggregation scenarios 34-38 for different spectrum allocations of a first component carrier $f_{DL1}$, a second component carrier $f_{DL2}$, a third component carrier $f_{DL3}$, a fourth component carrier $f_{DL4}$, and a fifth component carrier $f_{DL5}$. Although FIG. 2C is illustrated in the context of aggregating five component carriers, carrier aggregation can be used to aggregate more or fewer carriers. Moreover, although illustrated in the context of downlink, the aggregation scenarios are also applicable to uplink.

The first carrier aggregation scenario 34 depicts aggregation of component carriers that are contiguous and located within the same frequency band. Additionally, the second carrier aggregation scenario 35 and the third carrier aggregation scenario 36 illustrates two examples of aggregation that are non-contiguous, but located within the same frequency band. Furthermore, the fourth carrier aggregation scenario 37 and the fifth carrier aggregation scenario 38 illustrates two examples of aggregation in which component carriers that are non-adjacent in frequency and in multiple frequency bands are aggregated. As a number of aggregated component carriers increases, a complexity of possible carrier aggregation scenarios also increases.

With reference to FIGS. 2A-2C, the individual component carriers used in carrier aggregation can be of a variety of frequencies, including, for example, frequency carriers in the same band or in multiple bands. Additionally, carrier aggregation is applicable to implementations in which the individual component carriers are of about the same bandwidth as well as to implementations in which the individual component carriers have different bandwidths.

Certain communication networks allocate a particular user device with a primary component carrier (PCC) or anchor carrier for uplink and a PCC for downlink. Additionally, when the mobile device communicates using a single frequency carrier for uplink or downlink, the user device communicates using the PCC. To enhance bandwidth for uplink communications, the uplink PCC can be aggregated with one or more uplink secondary component carriers (SCCs). Additionally, to enhance bandwidth for downlink communications, the downlink PCC can be aggregated with one or more downlink SCCs.

In certain implementations, a communication network provides a network cell for each component carrier. Additionally, a primary cell can operate using a PCC, while a secondary cell can operate using a SCC. The primary and second cells may have different coverage areas, for instance, due to differences in frequencies of carriers and/or network environment.

License assisted access (LAA) refers to downlink carrier aggregation in which a licensed frequency carrier associated with a mobile operator is aggregated with a frequency carrier in unlicensed spectrum, such as WiFi. LAA employs a downlink PCC in the licensed spectrum that carries control and signaling information associated with the communication link, while unlicensed spectrum is aggregated for wider downlink bandwidth when available. LAA can operate with dynamic adjustment of secondary carriers to avoid WiFi users and/or to coexist with WiFi users. Enhanced license assisted access (eLAA) refers to an evolution of LAA that aggregates licensed and unlicensed spectrum for both downlink and uplink.

Overview of Front End Systems with Switched Termination

A radio frequency (RF) communication system can include a front end system for processing RF signals transmitted and/or received by way of wireless communications. Examples of such RF communication systems include, but are not limited to, mobile phones, tablets, base stations, network access points, customer-premises equipment (CPE), laptops, and wearable electronics.

A front end system can be implemented to support a variety of features for enhancing bandwidth and/or other performance characteristics. In one example, a front end system is implemented to support carrier aggregation, thereby providing flexibility to increase peak data rates. In another example, a front end system is implemented to support MIMO communications to increase throughput and enhance mobile broadband service. For instance, MIMO communications benefit from higher signal to noise ratio, improved coding, and/or reduced signal interference due to spatial multiplexing differences of the radio environment.

Although implementing a front end system to support such features can provide a number of advantages, implementing the front end system in this manner can give rise to a number of coexistence or interoperability issues.

The teachings herein seek to provide a front end system that provides not only high isolation, but also exhibits robust intermodulation distortion (IMD) performance, such as good second-order intercept point (IP2) and/or third-order intercept point (IP3). In contrast, certain conventional front end systems suffer from a tradeoff between IMD and isolation, such as degraded IP2 and/or IP3 performance for a given amount of isolation.

A low impedance switch can be connected to a terminal of a band switch for shunting an inactive transmit path to ground, thereby providing good isolation. Although grounding an inactive transmit path can provide high isolation, the inventors have recognized that implementing the front end system in this manner can give rise to an impedance mismatch. The impedance mismatch leads to poor IMD performance, which in turn can degrade linearity and/or other performance specifications of the front end system.

Front end systems with switched termination for enhanced intermodulation distortion performance are provided herein. The switched termination can be used on transmit paths and/or receive paths of the front end system to suppress impedance variation when the signal paths are inactive.

For example, with respect to switched termination for transmit paths, a front end system can include a frequency multiplexing circuit (for instance, duplexing circuitry) connected to a band switch by a first RF signal path and by a second RF signal path. The band switch selectively provides the frequency multiplexing circuit with a first transmit signal over the first RF signal path and with a second transmit signal over the second RF signal path. The front end system further includes a switched termination circuit in shunt with the first RF signal path and operable to turn on to suppress impedance variation when the first RF signal path is inactive.

By implementing the front end system in this manner, a number of advantages are provided, such as low IMD variation versus frequency at interfering carrier frequencies. In contrast, conventional front end architectures fail to appreciate an impact of impedance variation resulting from shunting an unused transmit port with zero or low impedance.

Moreover, preserving termination impedance can enhance the performance of non-linear front end components, such as silicon on-insulator (SOI) switch transistors, which can be sensitive to changes in impedance and generate IMD as a function of impedance presented at each carrier frequency. Thus, implementing a front end system with switched termination can improve IMD performance of non-linear front end components.

Additionally or alternatively to switched termination for transmit paths, switched termination can be used for receive paths of the front end system. For example, in certain embodiments, a front end system includes a frequency multiplexing circuit connected to a first RF receive path and a second RF receive path. The front end system further includes a switched termination circuit in shunt with the first RF receive path and operable to turn on to suppress impedance variation when the first RF receive path is inactive.

Figure 3A:
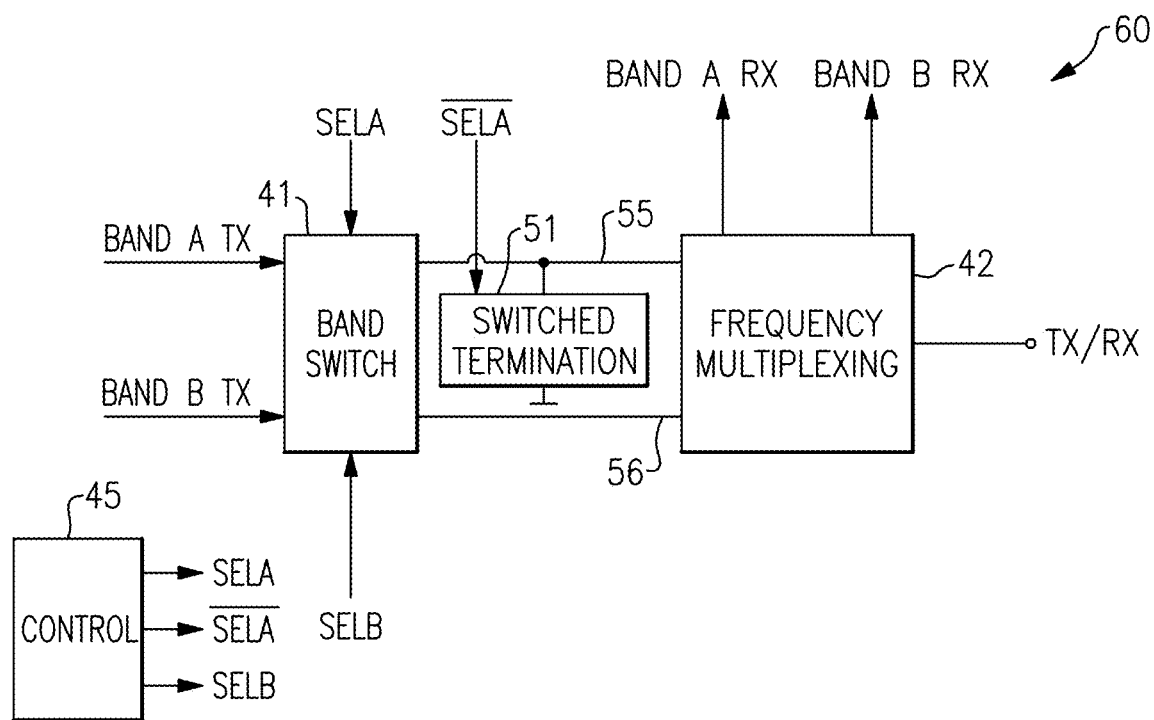
FIG. 3A is a schematic diagram of a front end system with switched termination according to one embodiment.

FIG. 3A is a schematic diagram of a front end system 60 with switched termination according to one embodiment. The front end system 60 includes a band switch 41, a frequency multiplexing circuit 42, a control circuit 45, and a switched termination circuit 51. Although one embodiment of a front end system with a switched termination circuit is shown, the teachings herein are applicable to front end systems implemented in a wide variety of ways.

In the illustrated embodiment, the band switch 41 receives a band A transmit signal (BAND A TX) and a band B transmit signal (BAND B TX). The band A transmit signal and band B transmit signal can correspond to transmit signals of a variety of frequency bands, including, but not limited to, frequency bands specified by 3GPP, such as 4G, LTE, and/or 5G bands. In the illustrated embodiment, the band switch 41 is a transmit band selection switch.

As shown in FIG. 3A, the band switch 41 further receives a band A selection signal (SELA) and a band B selection signal (SELB) for selecting the band A transmit signal and the band B transmit signal, respectively.

Although an example in which the band switch 41 selects between two transmit signals is shown, the band switch 41 can provide selection amongst three or more signals. Furthermore, a state of a band switch can be controlled in a wide variety of ways, including implementations using more or fewer selection signals.

The band switch 41 is coupled to the frequency multiplexing circuit 42 via a first RF signal path 55 and a second RF signal path 56. When the band A transmit signal is selected, the band switch 41 provides the band A transmit signal to the frequency multiplexing circuit 42 via the first RF signal path 55. Additionally, when the band B transmit signal is selected, the band switch 41 provides the band B transmit signal to the frequency multiplexing circuit 42 via the second RF signal path 56.

As shown in FIG. 3A, the frequency multiplexing circuit 42 is coupled to a bidirectional transmit/receive terminal (TX/RX), and outputs a band A receive signal (BAND A RX) and a band B receive signal (BAND B RX). The frequency multiplexing circuit 42 can be implemented in a wide variety of ways, including, but not limited to, using one or more duplexers, one or more quadplexers, one or more switches, and/or other suitable circuitry for multiplexing transmit and receive signals. Although the illustrated frequency multiplexing circuit 42 outputs two receive signals, a frequency multiplexing circuit can be implemented to output more or fewer signals.

The frequency multiplexing circuit 42 can be used for multiplexing a wide variety of types of signals, such as signals associated with FDD and/or TDD communications. In one example, band A and/or band B are used for communicating FDD signals associated with various carrier aggregation scenarios. In another example, band A and/or band B is used for communicating TDD signals, such as asynchronously operated TDD bands. For instance, asynchronous TDD can suffer from IP3 considerations, for instance, $+/-n*FDD_1 +/- m*TDD_2 = TDD_3$, where $TDD_2$ and $TDD_3$ are asynchronous (mixed Tx and Rx timing) and $TDD_3$ corresponds to the victim Rx band.

The illustrated embodiment includes the switched termination circuit 51, which is activated by a band A termination activation signal ($\overline{SELA}$), which is controlled complementary to selection of the band A transmit signal by the band A selection signal (SELA). Thus, when the band switch 41 provides the band A transmit signal to the frequency multiplexer 42 over the first RF signal path 55 such that the first RF signal path 55 is active, the switched termination circuit 51 is turned off and does not provide termination. However, when the band A transmit signal is not provided over the first RF signal path 55 such that the first RF signal path 55 is inactive, the switched termination circuit 51 is turned on to provide termination.

Thus, the switched termination circuit 51 turns on to provide impedance matching when the first RF signal path 55 is inactive. By including the switched termination circuit 51, impedance matching at the transmit/receive terminal (TX/RX) is provided, thereby enhancing IMD performance of the front end system 60.

Although an example including one switched termination circuit is depicted, a front end system can include multiple switched termination circuits. For example, the second RF signal path 56 can additionally or alternatively include a switched termination circuit that turns on to provide impedance matching when the second RF signal path 56 is inactive. Furthermore, one or more additional RF signal paths can be included between the band switch 41 and the frequency multiplexing circuit 42, and any number of the additional RF signal paths can include a switched termination circuit.

In the illustrated embodiment, the control circuit 45 generates the band A selection signal (SELA), the band B selection signal (SELB), and the band A termination activation signal ($\overline{SELA}$). In certain implementations, the control circuit 45 controls the state of the signals based on data received over a chip interface or bus.

Figure 3B:
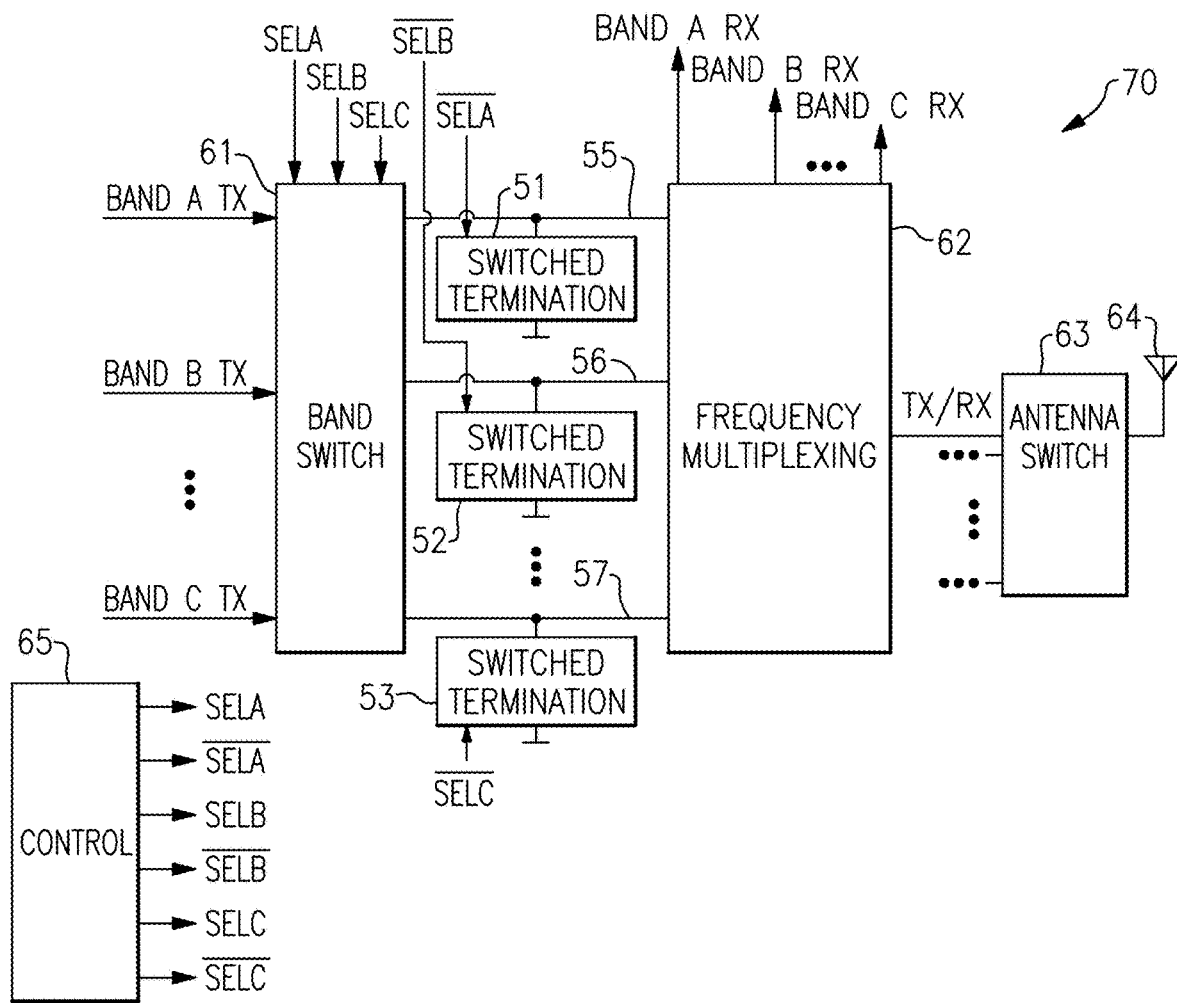
FIG. 3B is a schematic diagram of a front end system with switched termination according to another embodiment.

FIG. 3B is a schematic diagram of a front end system 70 with switched termination according to another embodiment. The front end system 70 includes a first switched termination circuit 51, a second switched termination circuit 52, a third switched termination circuit 53, a band switch 61, a frequency multiplexing circuit 62, an antenna switch 63, an antenna 64, a control circuit 65.

The front end system 70 of FIG. 3B is similar to the front end system 60 of FIG. 3A, except that the band switch 61 and the frequency multiplexing circuit 62 each operate over an additional frequency band (denoted by band C, in this example), with each RF signal path between the band switch 61 and the frequency multiplexing circuit 62 including a switched termination circuit in shunt with the RF signal path. Furthermore, the front end system 70 of FIG. 3B further includes the antenna switch 63 and the antenna 64.

Thus, the frequency multiplexing circuit 62 not only outputs the band A receive signal (BAND A RX) and the band B receive signal (BAND B RX), but also the band C receive signal (BAND C RX). Furthermore, the band switch 61 receives not only the band A transmit signal (BAND A TX) and the band B transmit signal (BAND B TX), but also the band C transmit signal (BAND C TX). Moreover, the band switch 61 and the frequency multiplexing circuit 62 are coupled by a first RF signal path 55, a second RF signal path 56, and a third RF signal path 57, which are selectively terminated with the first switched termination circuit 51, the second switched termination circuit 52, and the third switched termination circuit 53, respectively.

Although an example operating over three frequency bands and using three switched termination circuits is shown, a front end system can operate over more or fewer frequency bands and/or include more or fewer switched termination circuits.

In the illustrated embodiment, the control circuit 65 generates the band A selection signal (SELA), the band B selection signal (SELB), the band C selection signal (SELC), the band A termination activation signal ($\overline{\text{SELA}}$), the band B termination activation signal ($\overline{\text{SELB}}$), and the band C termination activation signal ($\overline{\text{SELC}}$). In certain implementations, the control circuit 45 controls the state of the signals based on data received over a chip interface or bus.

Figure 3C:
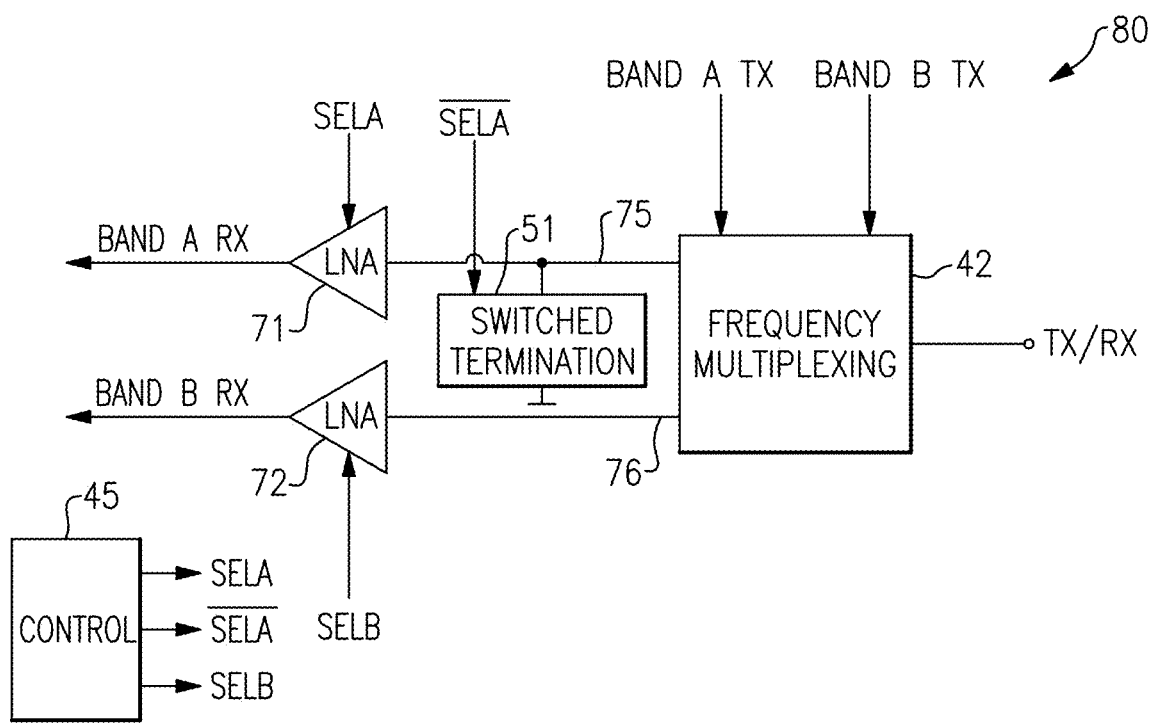
FIG. 3C is a schematic diagram of a front end system with switched termination according to another embodiment.

FIG. 3C is a schematic diagram of a front end system 80 with switched termination according to another embodiment. The front end system 80 includes a frequency multiplexing circuit 42, a control circuit 45, a switched termination circuit 51, a first low noise amplifier (LNA) 71, and a second LNA 72. Although another embodiment of a front end system with a switched termination circuit is shown, the teachings herein are applicable to front end systems implemented in a wide variety of ways.

As shown in FIG. 3C, the frequency multiplexing circuit 42 is coupled to a bidirectional transmit/receive terminal (TX/RX), and receives a band A transmit signal (BAND A TX) and a band B transmit signal (BAND B TX). The frequency multiplexing circuit 42 can be implemented in a wide variety of ways, including, but not limited to, using one or more duplexers, one or more quadplexers, one or more switches, and/or other suitable circuitry for multiplexing transmit and receive signals. Although the illustrated frequency multiplexing circuit 42 receive two transmit signals, a frequency multiplexing circuit can be implemented to receive more or fewer transmit signals.

The frequency multiplexing circuit 42 can be used for multiplexing a wide variety of types of signals, such as signals associated with FDD and/or TDD communications. In one example, band A and/or band B are used for communicating FDD signals associated with various carrier aggregation scenarios. In another example, band A and/or band B is used for communicating TDD signals, such as asynchronously operated TDD bands.

In the illustrated embodiment, the frequency multiplexing circuit 42 is also coupled to the first LNA 71 over a first RF signal path 75, and to the second LNA 72 over a second RF signal path 76. As shown in FIG. 3C, the first LNA 71 receives a band A selection signal (SELA) for enabling the first LNA 71. When enabled, the first LNA 71 amplifies the RF signal on the first RF signal path 75 to generate a band A receive signal (BAND A RX). Additionally, the second LNA 72 receives a band B selection signal (SELB) for enabling the second LNA 72. When enabled, the second LNA 72 amplifies the RF signal on the second RF signal path 76 to generate a band B receive signal (BAND B RX).

The band A receive signal and band B receive signal can correspond to transmit signals of a variety of frequency bands, including, but not limited to, frequency bands specified by 3GPP, such as 4G, LTE, and/or 5G bands.

The illustrated embodiment includes the switched termination circuit 51, which is activated by a band A termination activation signal ($\overline{\text{SELA}}$), which is controlled complementary to the band A selection signal (SELA). Thus, when the first LNA 71 is enabled, the switched termination circuit 51 is turned off and does not provide termination. However, when the first LNA 71 is disabled, the switched termination circuit 51 is turned on to provide termination.

Thus, the switched termination circuit 51 turns on to provide impedance matching when the first RF signal path 75 is inactive. By including the switched termination circuit 51, impedance matching at the transmit/receive terminal (TX/RX) is provided, thereby enhancing IMD performance of the front end system 80.

Although an example including one switched termination circuit is depicted, a front end system can include multiple switched termination circuits. For example, the second RF signal path 76 can additionally or alternatively include a switched termination circuit that turns on to provide impedance matching when the second RF signal path 76 is inactive. Furthermore, one or more additional RF signal paths can be included, and any number of the additional RF signal paths can include a switched termination circuit.

Figure 3D:
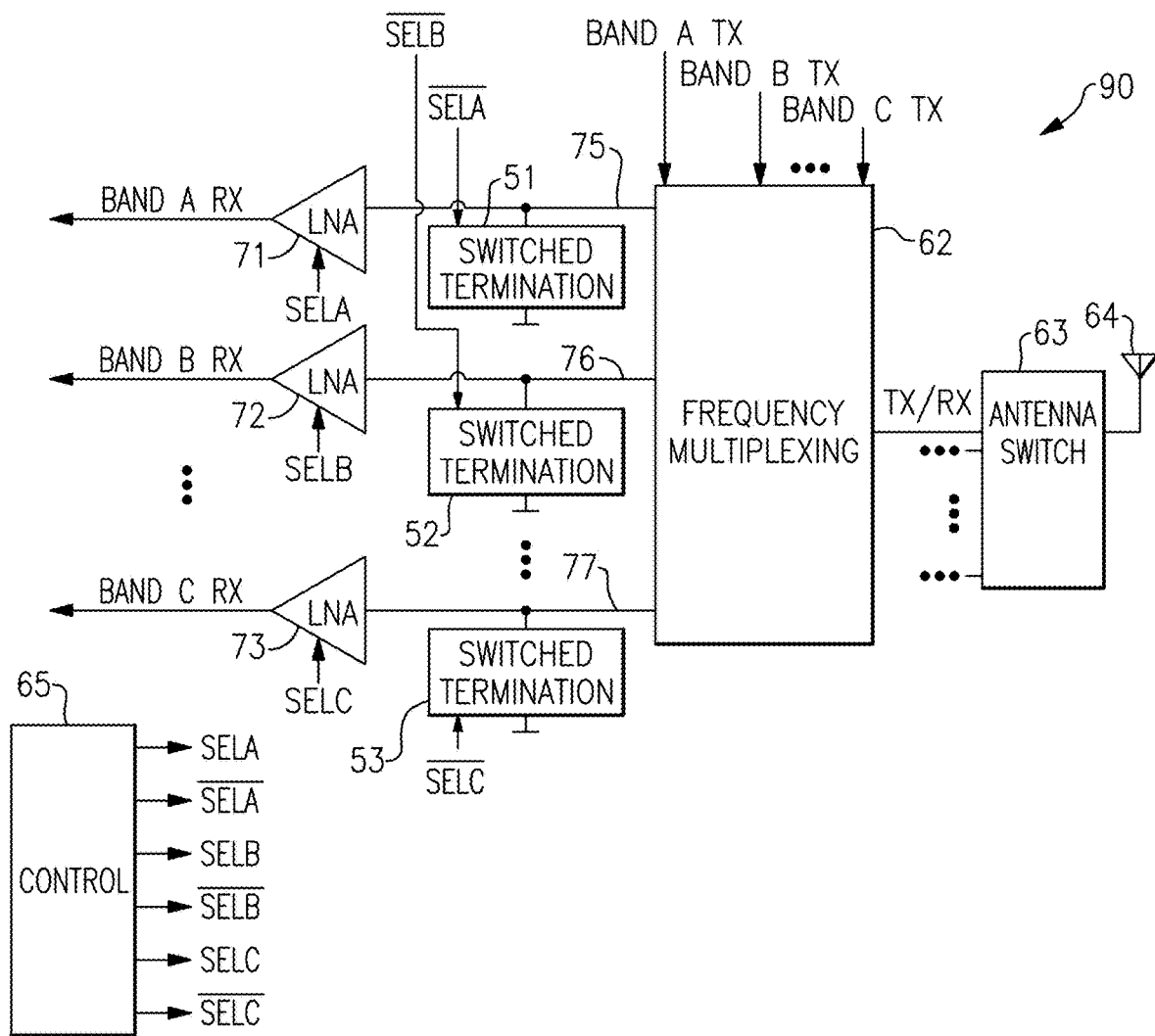
FIG. 3D is a schematic diagram of a front end system with switched termination according to another embodiment.

FIG. 3D is a schematic diagram of a front end system 90 with switched termination according to another embodiment. The front end system 90 includes a first switched termination circuit 51, a second switched termination circuit 52, a third switched termination circuit 53, a frequency multiplexing circuit 62, an antenna switch 63, an antenna 64, a control circuit 65, a first LNA 71, a second LNA 72, and a third LNA 73.

The front end system 90 of FIG. 3D is similar to the front end system 80 of FIG. 3C, except that the front end system 90 further includes the antenna switch 63 and the antenna 64, and the frequency multiplexing circuit 62 operates over an additional frequency band (denoted by band C, in this example).

Thus, the frequency multiplexing circuit 62 receives a band C transmit signal (BAND C TX) and is coupled to the third LNA 73 over a third RF signal path 77. The third LNA 73 is controlled by a band C selection signal (SELC), and outputs a band C receive signal (BAND C RX) when enabled. The first RF signal path 75, the second RF signal path 76, and the third R signal path 77 are selectively terminated by the first switched termination circuit 51, the second switched termination circuit 52, and the third switched termination circuit 53, respectively.

Although an example operating over three frequency bands and using three switched termination circuits is shown, a front end system can operate over more or fewer frequency bands and/or include more or fewer switched termination circuits.

Figure 3E:
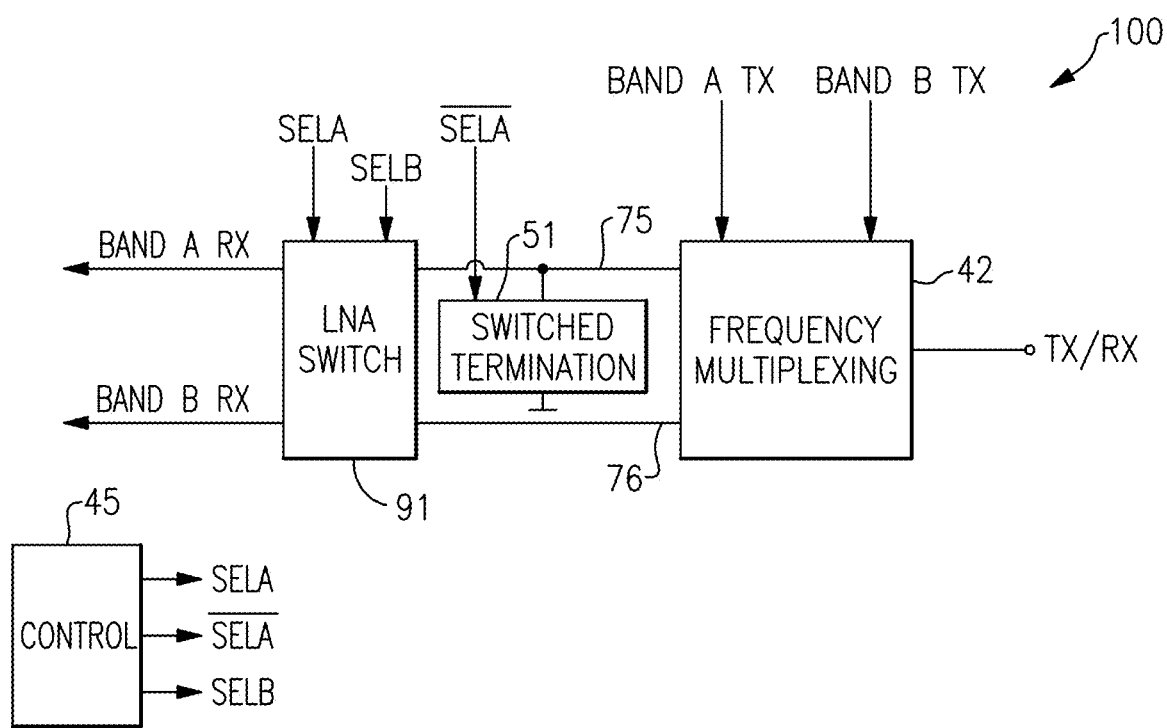
FIG. 3E is a schematic diagram of a front end system with switched termination according to another embodiment.

FIG. 3E is a schematic diagram of a front end system 100 with switched termination according to another embodiment. The front end system 100 includes a frequency multiplexing circuit 42, a control circuit 45, a switched termination circuit 51, and an LNA switch 91.

The front end system 100 of FIG. 3E is similar to the front end system 80 of FIG. 3C, except that the front end system 100 omits the first LNA 71 and the second LNA 72 and includes the LNA switch 91. The LNA switch 91 is also referred to herein as a receive switch.

In the illustrated embodiment, the LNA switch 91 outputs a band A receive signal (BAND A RX) when the band A selection signal (SELA) is active, and outputs a band B receive signal (BAND B RX) when the band B selection signal (SELB) is active. In certain implementations, the band A receive signal (BAND A RX) and the band B receive signal (BAND B RX) are provided to a common or shared LNA, thereby reducing amplifier overhead and component count relative to an implementation including a separate LNA for each path.

The switched termination circuit 51 activates when the first RF signal path 75 is inactive. By including the switched termination circuit 51, impedance matching at the transmit/receive terminal (TX/RX) is provided, thereby enhancing IMD performance of the front end system 100.

Although an example with two RF receive paths and one switched termination circuits is shown, addition RF receive paths and/or switched termination circuits can be included.

Figure 4A:
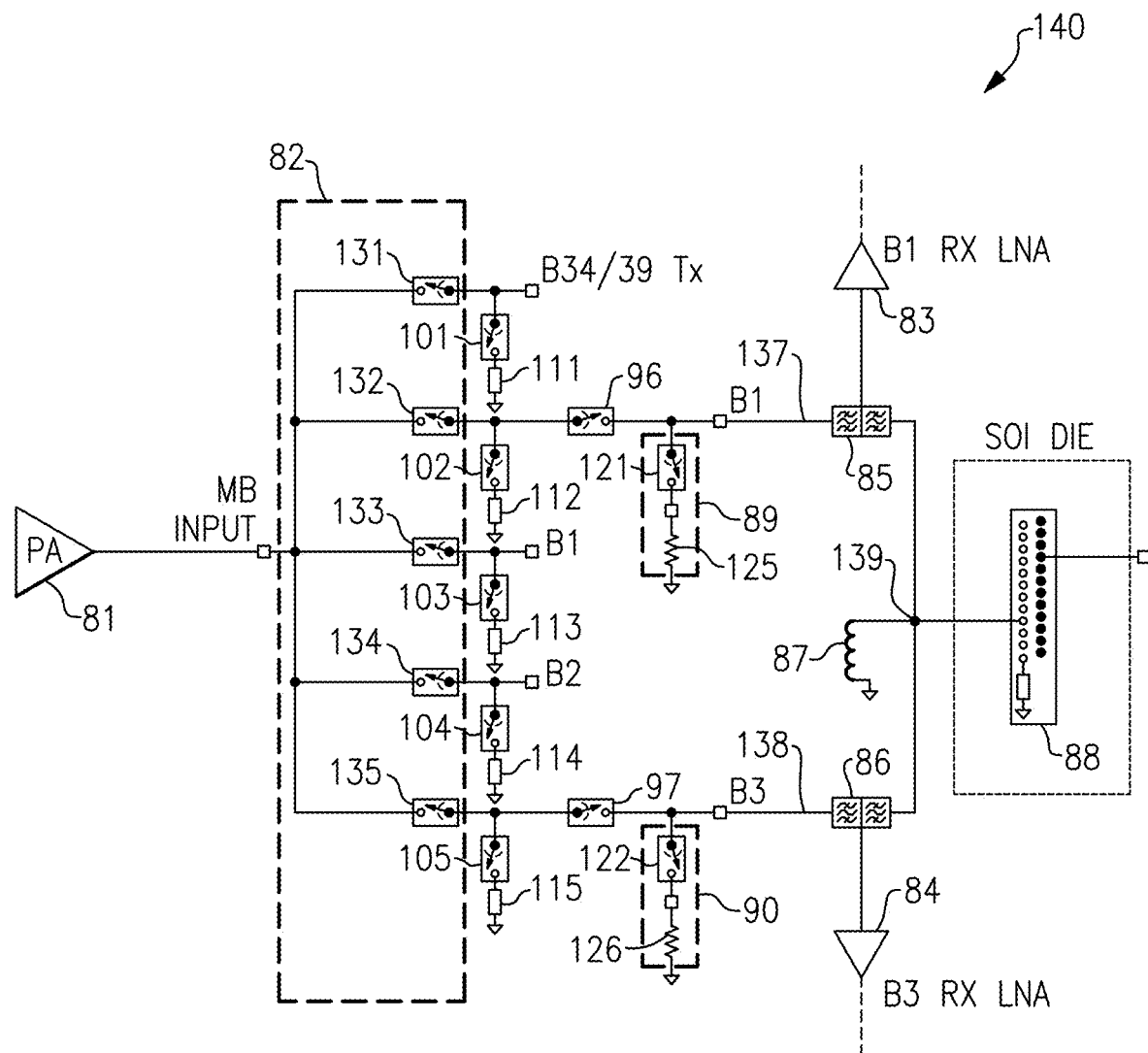
FIG. 4A is a schematic diagram of a front end system with switched termination according to another embodiment.

FIG. 4A is a schematic diagram of a front end system 140 with switched termination according to another embodiment. The front end system 140 includes a power amplifier 81, a band switch 82, a B1 LNA 83, a B3 LNA 84, a B1 duplexer 85, a B3 duplexer 86, a matching inductor 87, an antenna switch 88 (implemented on an SOI die, in this example), a B1 switched termination circuit 89, a B3 switched termination circuit 90, a B1 decoupling switch 96, a B3 decoupling switch 97, a first shunt grounding switch 101, a second shunt grounding switch 102, a third shunt grounding switch 103, a fourth shunt grounding switch 104, a fifth shunt grounding switch 105, a first low impedance element 111, a second low impedance element 112, a third low impedance element 113, a fourth low impedance element 114, and a fifth low impedance element 115.

As shown in FIG. 4A, an output of the power amplifier 81 is coupled to a mid band (MB) input of the band switch 82. The band switch 82 includes a B34/39 selection switch 131, a B1 selection switch 132, another B1 selection switch 133, a B2 selection switch 134, and a B3 selection switch 135. In the illustrated embodiment, the power amplifier 81 is shared across multiple frequency bands, thereby reducing cost, area, and/or complexity. However, in other implementations, two or more power amplifiers can be included.

The B1 switched termination 89 includes a shunt switch 121 and a termination resistor 125, which in certain implementations is about 50 ohms. The shunt switch 121 is opened when the B1 transmit signal path 137 is active and closed when the B1 transmit signal path 137 is inactive.

The B3 switched termination 90 includes a shunt switch 122 and a termination resistor 126, which in certain implementations is about 50 ohms. The shunt switch 122 is opened when the B3 transmit signal path 138 is active and closed when the B3 transmit signal path 138 is inactive.

Including the B1 switched termination circuit 89 and B3 switched termination circuit 90 improves impedance matching relative to an implementation in which the switched termination circuits are omitted. For example, impedance matching at node 139 (corresponding to a bidirectional TX/RX node) can be enhanced by terminating the B1 transmit signal path 137 when B1 transmission is inactive, and by terminating the B3 transmit signal path 138 when B3 transmission is inactive.

Accordingly, the B1 switched termination circuit 89 operates to preserve impedance to be substantially constant (for instance, about 50 ohms) at the B1 transmit frequencies at node 139, while the B3 switched termination circuit 90 operates to preserve impedance to be substantially constant at the B3 transmit frequencies at node 139.

In certain implementations herein, a switched termination circuit operates to terminate a signal path associated with a frequency band across a frequency range of the band. For example, the switched termination circuit can maintain impedance substantially constant for signal frequencies within the frequency band.

The front end system 140 of FIG. 4A further includes the grounding switches 101-105 and low impedance elements 111-115, which are used to shunt unused ports or terminals of the band switch 82 to ground, thereby providing high isolation. Additionally, the B1 decoupling switch 96 and the B3 decoupling switch 97 are included, which have relatively low insertion loss for signaling performance while achieving sufficient isolation.

By including both grounding switches and switched termination circuits, both high isolation and robust IMD performance can be achieved.

For example, although the termination resistors 125-126 provide good suppression of impedance variation, the resistance of the termination resistors 125-126 may be too high to provide good isolation of the blocker frequency to the output of the power amplifier 81 (for instance, a collector of a bipolar transistor or a drain of a field-effect transistor). Thus, including both the termination resistors 125-126 for providing termination and the grounding switches 101-105 for providing isolation can reduce or eliminate a tradeoff between isolation and IMD performance.

In the illustrated embodiment, switched termination circuits are used to enhance performance of a front end system that communicates in part using B1 and B3. For example, the front end system 140 can suffer from a B1+B3 uplink carrier aggregation scenario having a third order IMD sensitivity consideration of $2*B1_{TX} \times B3_{TX} = B1_{RX}$, where one of $B1_{TX}$ or $B3_{TX}$ is from the power amplifier 81 and the other is from a satellite power amplifier (see for example, the configuration of FIG. 8).

Although an example of a front end system operating over specific examples of frequency bands is shown, the teachings herein are applicable to RF front ends operating over a wide variety of frequency bands. Accordingly, other implementations are possible.

Figure 4B:
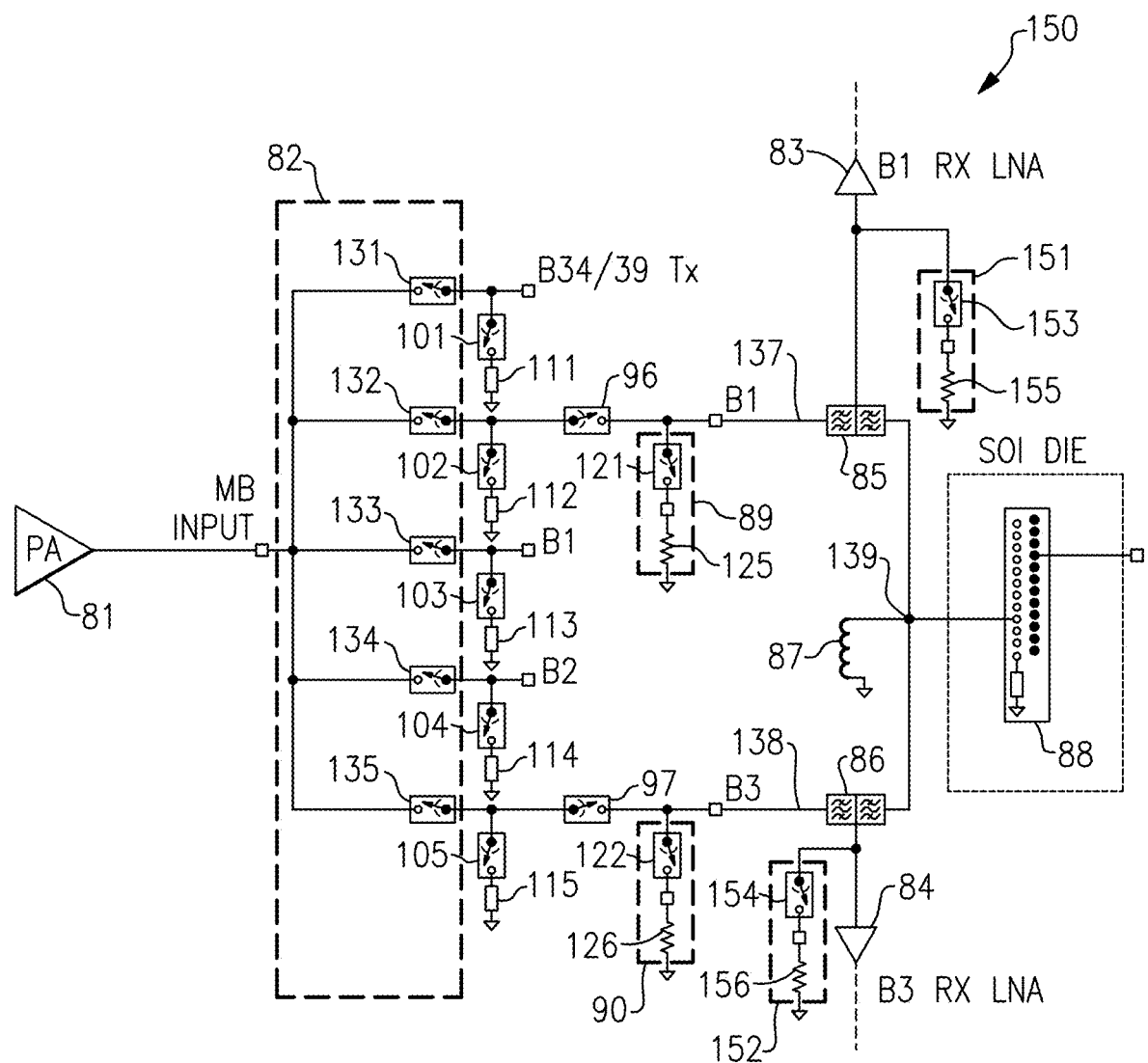
FIG. 4B is a schematic diagram of a front end system with switched termination according to another embodiment.

FIG. 4B is a schematic diagram of a front end system 150 with switched termination according to another embodiment. The front end system 150 includes a power amplifier 81, a band switch 82, a B1 LNA 83, a B3 LNA 84, a B1 duplexer 85, a B3 duplexer 86, a matching inductor 87, an antenna switch 88 (implemented on an SOI die, in this example), a first B1 switched termination circuit 89, a first B3 switched termination circuit 90, a B1 decoupling switch 96, a B3 decoupling switch 97, first to fifth shunt grounding switches 101-105, respectively, first to fifth low impedance elements 111-115, respectively, a second B1 switched termination circuit 151, and a second B3 switched termination circuit 152.

The front end system 150 of FIG. 4B is similar to the front end system 140 of FIG. 4A, except that the front end system 150 further includes the second B1 switched termination circuit 151 and the second B3 switched termination circuit 152.

When the B1 LNA 83 is enabled, the second B1 switched termination circuit 151 is disabled. However, when the B1 LNA 83 is disabled, the second B1 switched termination circuit 151 is enabled to terminate the input of the B1 LNA 83. Additionally, when the B3 LNA 84 is enabled, the second B3 switched termination circuit 152 is disabled.

However, when the B3 LNA 84 is disabled, the second B3 switched termination circuit 152 is enabled to terminate the input of the B3 LNA 84.

Figure 5A:
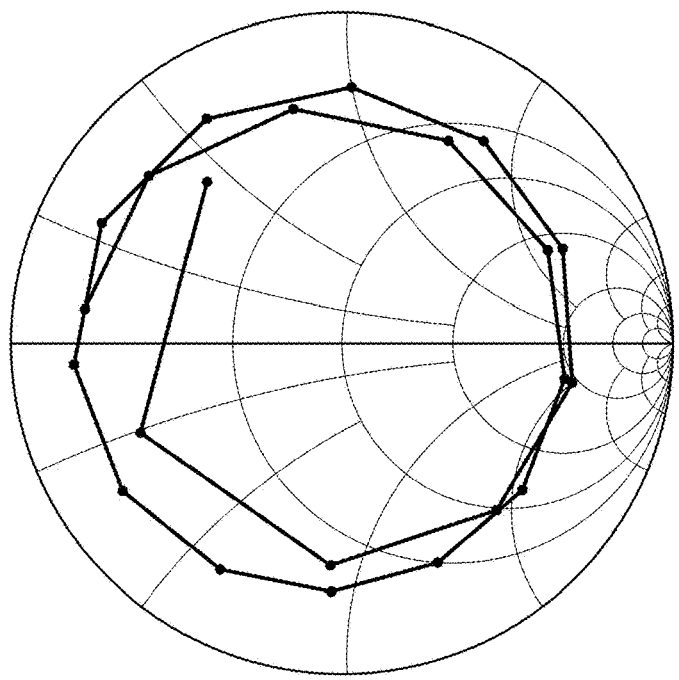
FIG. 5A is one example of a Smith chart for a front end system without switched termination.

FIG. 5A is one example of a Smith chart for a front end system without switched termination. The Smith chart corresponds to simulations of one implementation of the front end system 140 of FIG. 4A in which the B1 switched termination circuit 89 and the B3 switched termination circuit 90 are omitted. The Smith chart provides a graphical illustrated of impedance at node 139 at the input of the antenna switch 88 for an implementation without switched termination.

As shown by the relatively loose contour of FIG. 5A, the impedance is relatively uncontrolled. For example, approximately 0 ohms at terminal B3 of FIG. 4A and a relatively high phase shift versus frequency of the B3 duplexer 86 results in uncontrolled impedance at the node 139. Since IMD can be relative high at high impedance values and relatively low at low impedance values, the IMD performance of the front end system associated with FIG. 5A can fluctuate relatively greatly.

Figure 5B:
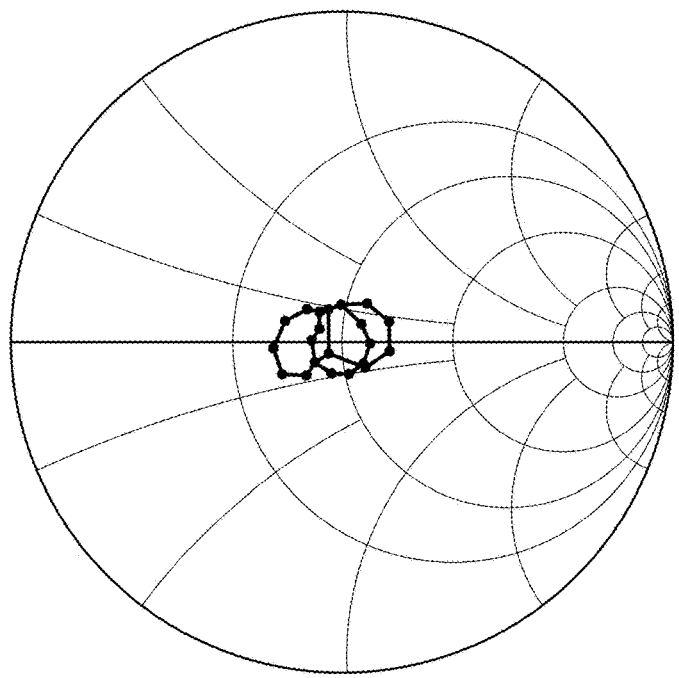
FIG. 5B is one example of a Smith chart for a front end system with switched termination.

FIG. 5B is one example of a Smith chart for a front end system with switched termination. The Smith chart corresponds to simulations of one implementation of the front end system 140 of FIG. 4A in which the B1 switched termination circuit 89 and the B3 switched termination circuit 90 are included. As shown by a comparison of FIGS. 5A and 5B, the Smith chart of FIG. 5B corresponds to a tighter contour and more tightly controlled impedance. Thus, the Smith chart of FIG. 5B is associated with superior IMD performance relative to the Smith chart of FIG. 5A.

Figure 6:
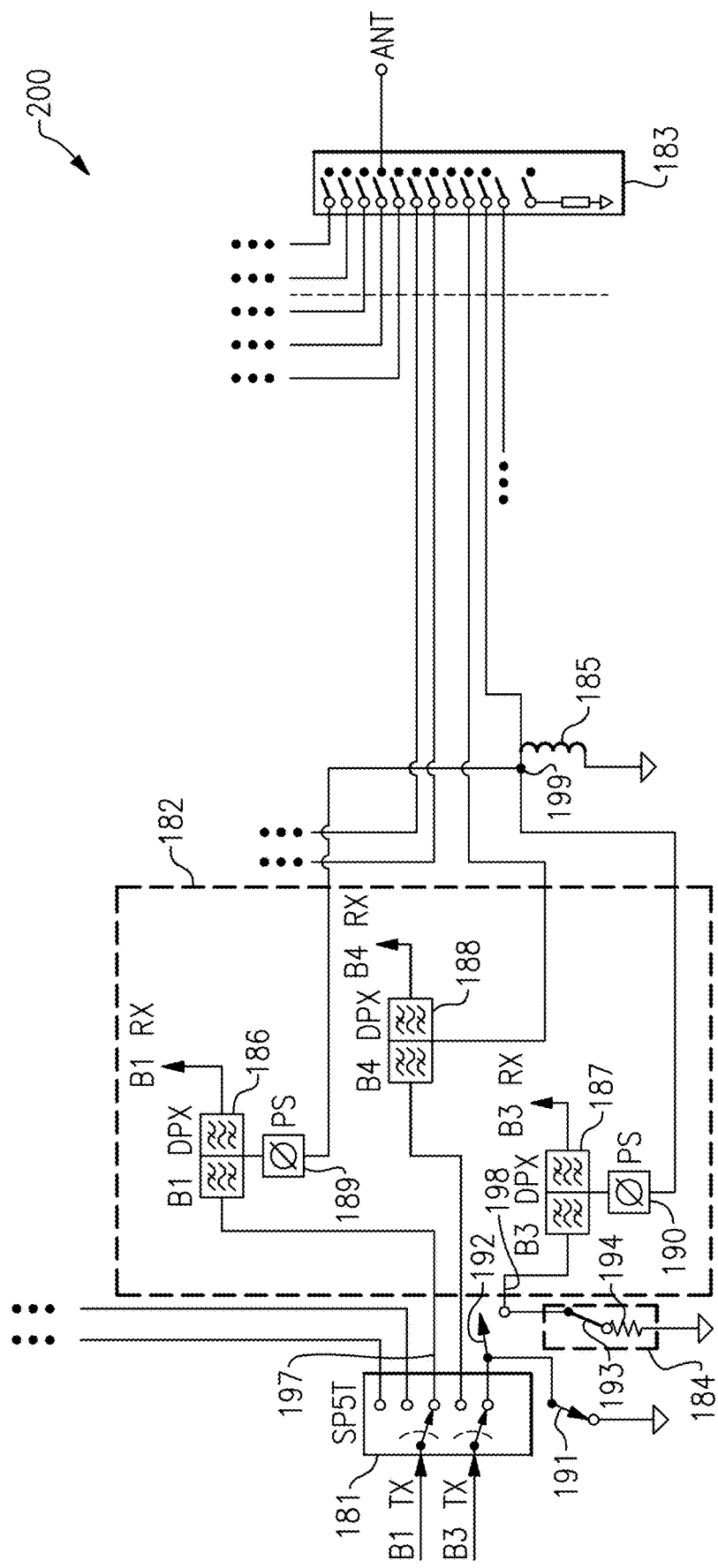
FIG. 6 is a schematic diagram of a front end system with switched termination according to another embodiment.

FIG. 6 is a schematic diagram of a front end system 200 with switched termination according to another embodiment. The front end system 200 includes a band switch 181, a frequency multiplexing circuit 182, an antenna switch 183, a switched termination circuit 184, a matching inductor 185, a grounding switch 191, and a decoupling switch 192. The switched termination circuit 184 includes a shunt switch 193 and a termination resistor 194, which can be substantially 50 ohms or other desired termination impedance value.

The frequency multiplexing circuit 182 includes a B1 duplexer 186, a B3 duplexer 187, a B4 duplexer 188, a B1 phase shifter 189, and a B3 phase shifter 190. Although one example of a frequency multiplexing circuit is shown, other implementations are possible, such as configurations using a quadplexer and/or other suitable multiplexing circuitry.

The illustrated band switch 181 receives a B1 transmit signal (B1 TX), which the band switch 181 selectively provides to the frequency multiplexing circuit 182 over a B1 transmit signal path 197. Additionally, the band switch 181 receives a B3 transmit signal (B3 TX), which the band switch 181 selectively provides to the frequency multiplexing circuit 182 over a B3 transmit signal path 198.

Including the switched termination circuit 184 preserves impedance matching at the node 199, even when the grounding switch 191 is closed to provide good isolation. Accordingly, isolation can be achieved while maintaining high IMD performance.

Figure 7A:
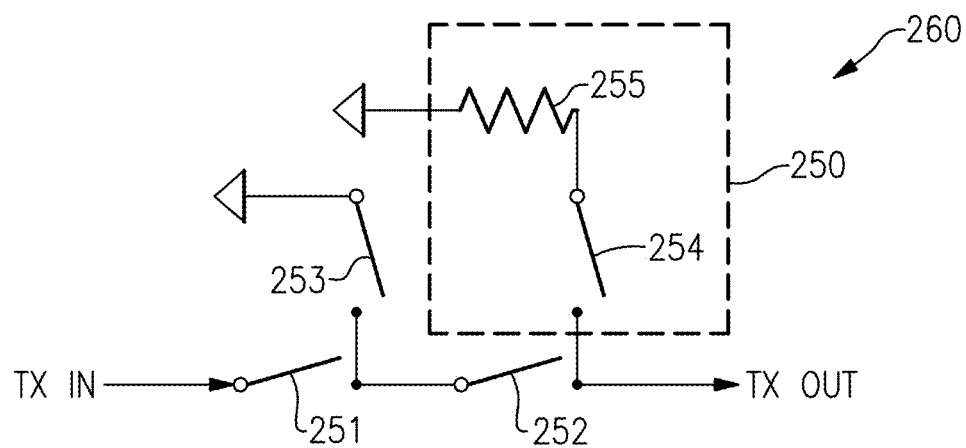
FIG. 7A is a schematic diagram of one embodiment of a switch configuration for a terminal of a band switch.

FIG. 7A is a schematic diagram of one embodiment of a switch configuration 260 for a terminal of a band switch. The switch configuration 260 includes a switched termination circuit 250, a band selection switch 251, a decoupling switch 252, and a grounding switch 253. The switched termination circuit 250 includes a shunt switch 254 and a termination resistor 255, which is about 50 ohm in certain implementations.

When the band selection switch 251 and the decoupling switch 252 are closed and the grounding switch 253 and shunt switch 254 are opened, a transmit input signal (TX IN) propagates through the switch configuration 260 to thereby provide a transmit output signal (TX OUT). However, when the band selection switch 251 and the decoupling switch 252 are opened and the grounding switch 253 and shunt switch 254 are closed, the transmit input signal does not propagate through the switch configuration 260. Rather, the grounding switch 253 provides grounding for high isolation and the switched termination circuit 250 provided impedance matching for good IMD performance.

Accordingly, the illustrated switch configuration 260 provides both high isolation and good IMD performance.

Figure 7B:
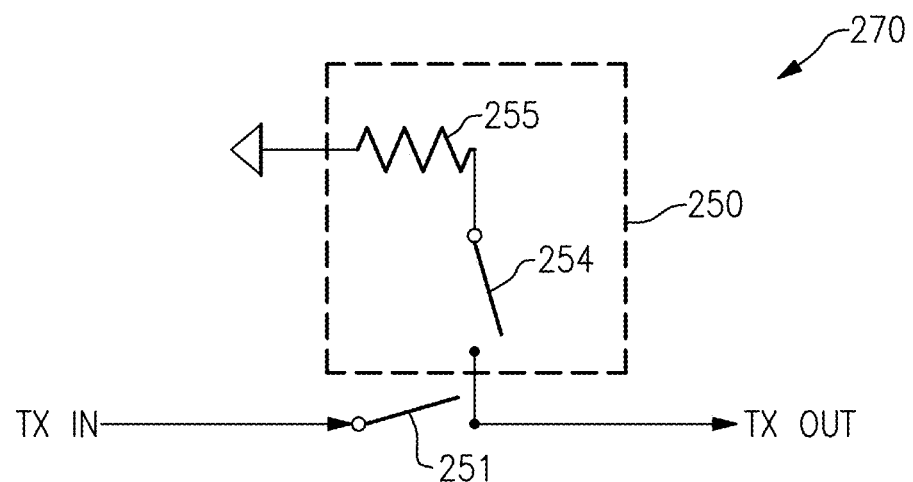
FIG. 7B is a schematic diagram of another embodiment of a switch configuration for a terminal of a band switch.

FIG. 7B is a schematic diagram of another embodiment of a switch configuration 270 for a terminal of a band switch. The switch configuration 270 of FIG. 7B is similar to the switch configuration 260 of FIG. 7A, except that the decoupling switch 252 and the grounding switch 253 are omitted. The switch configuration 270 of FIG. 7B provides poorer isolation but lower complexity relative to the switch configuration 260 of FIG. 7A.

Figure 8:
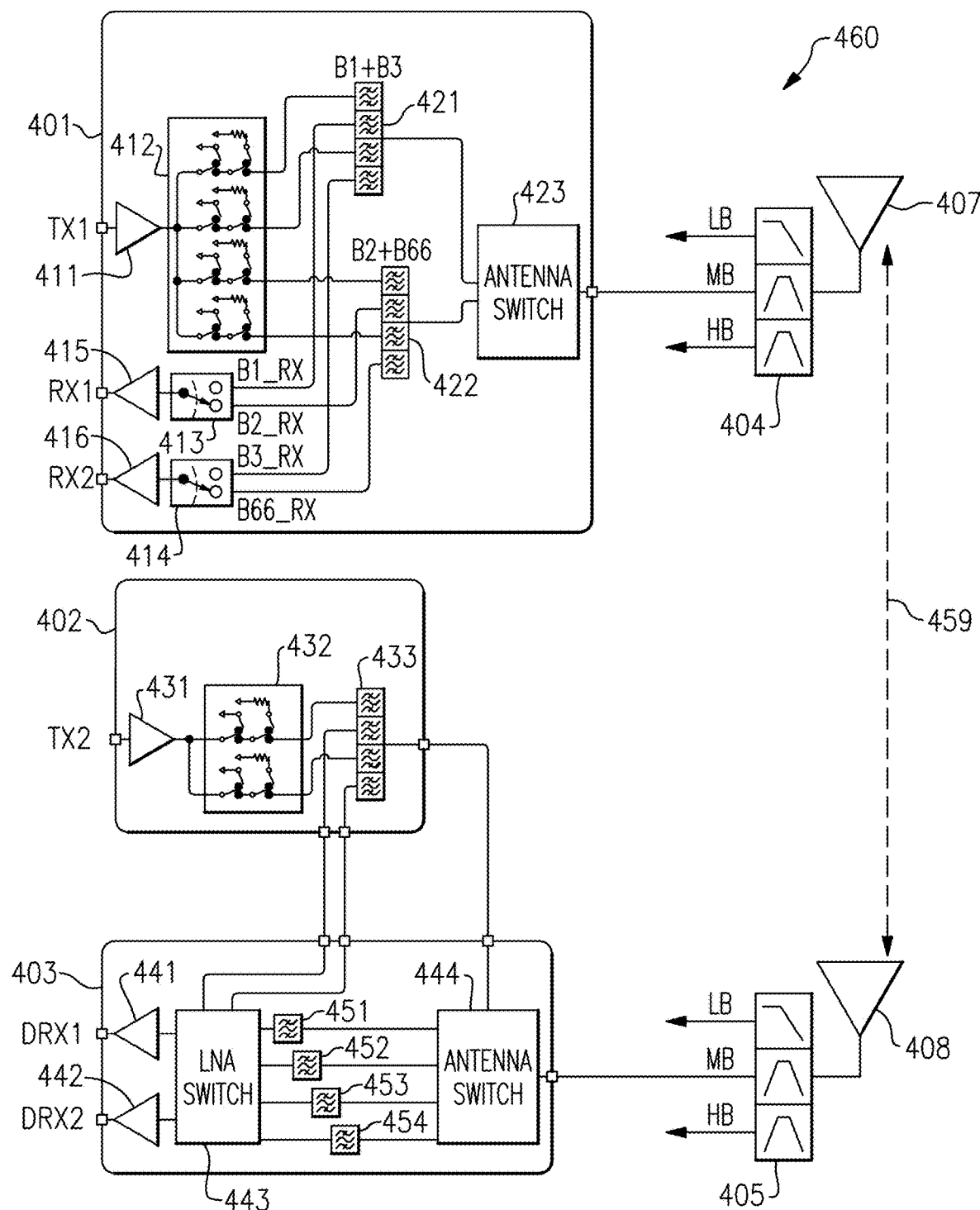
FIG. 8 is a schematic diagram of a front end system with switched termination according to another embodiment.

FIG. 8 is a schematic diagram of a front end system 460 with switched termination according to another embodiment. The front end system 460 includes a primary transmit and receive (TX/RX) module 401, a secondary transmit (TX) module 402, a diversity/MIMO module 403, a primary triplexer 404, a diversity triplexer 405, a primary antenna 407, and a diversity antenna 408.

As shown in FIG. 8, the primary TX/RX module 401 includes a power amplifier 411, a transmit band selection switch 412 implemented with switched termination, a first receive band selection switch 413, a second receive band selection switch 414, a B1+B3 quadplexer 421, a B2+B66 quadplexer 422, and an antenna switch 423.

Additionally, the secondary TX module 401 includes a power amplifier 431, a transmit band selection switch 432 implemented with switched termination, and a quadplexer 433.

Furthermore, the diversity/MIMO module 403 includes a first LNA 441, a second LNA 442, an LNA switch 443, an antenna switch 444, a first filter 451, a second filter 452, a third filter 453, and a fourth filter 454.

The front end system 460 communicates over a wide variety of frequency bands, including those associated with low band (LB), mid band (MB), and high band (HB) frequency ranges. For example, LB signals can have a frequency content of 1 GHz or less, MB signals can have a frequency content between 1 GHz and 2.3 GHz, and HB signals can have a frequency content of 2.3 GHz or higher. Examples of LB frequencies include, but are not limited to Band 8, Band 20, and Band 26. Examples of MB frequencies include, but are not limited to, Band 1, Band 2, Band 3, Band 4, and Band 66. Examples of HB frequencies include, but are not limited to, Band 7, Band 38, and Band 41.

The illustrated end system 460 operates with finite isolation 459 between the primary antenna 407 and the diversity antenna 408. In this embodiment, the power amplifier 431 transmits via the diversity antenna 408 and the power amplifier 411 transmits via the primary antenna 407. Transmitting by separate antennas can enhance performance for difficult uplink carrier aggregation scenarios by reducing IMD. The linearity of an antenna switch (for instance, the antenna switch 423 and/or the antenna switch 444) can limit a receive sensitivity of the front end system 460.

By implementing the transmit band selection switch 412 and the transmit band selection switch 432 with switched termination circuits, the linearity of the antenna switch 423 and the antenna switch 444 is improved. Thus, the front end system 460 can operate with enhanced performance, including, but not limited to, higher receive sensitivity.

Although one embodiment of a front end system with switched termination circuits is shown, the teachings herein are applicable to front end systems implemented in a wide variety of ways.

Figure 9:
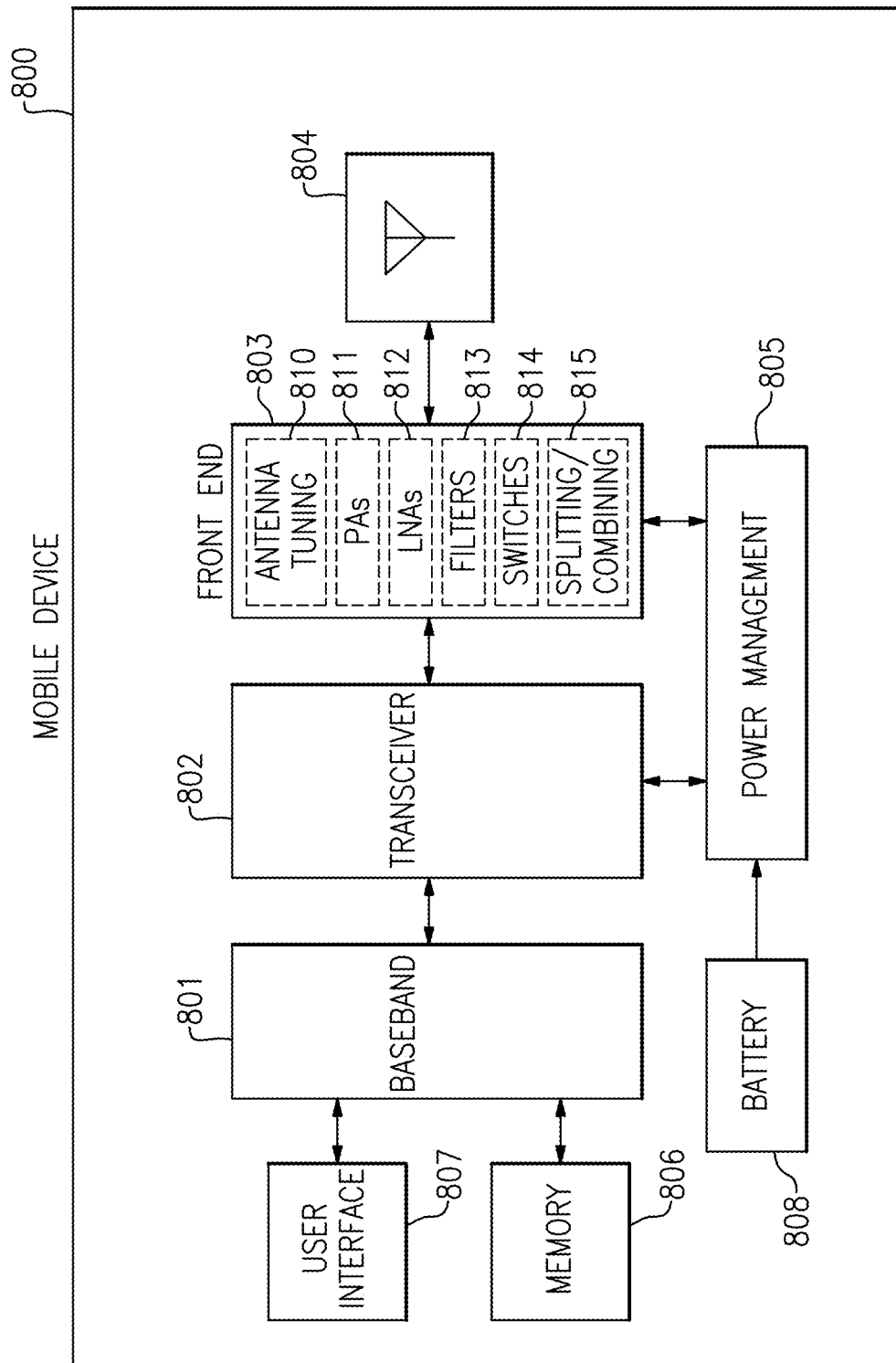
FIG. 9 is a schematic diagram of one embodiment of a mobile device.

FIG. 9 is a schematic diagram of one embodiment of a mobile device 800. The mobile device 800 includes a baseband system 801, a transceiver 802, a front end system 803, antennas 804, a power management system 805, a memory 806, a user interface 807, and a battery 808.

The mobile device 800 can be used communicate using a wide variety of communications technologies, including, but not limited to, 2G, 3G, 4G (including LTE, LTE-Advanced, and LTE-Advanced Pro), 5G NR, WLAN (for instance, WiFi), WPAN (for instance, Bluetooth and ZigBee), WMAN (for instance, WiMax), and/or GPS technologies.

The transceiver 802 generates RF signals for transmission and processes incoming RF signals received from the antennas 804. It will be understood that various functionalities associated with the transmission and receiving of RF signals can be achieved by one or more components that are collectively represented in FIG. 9 as the transceiver 802. In one example, separate components (for instance, separate circuits or dies) can be provided for handling certain types of RF signals.

The front end system 803 aids is conditioning signals transmitted to and/or received from the antennas 804. In the illustrated embodiment, the front end system 803 includes antenna tuning circuitry 810, power amplifiers (PAs) 811, low noise amplifiers (LNAs) 812, filters 813, switches 814, and signal splitting/combining circuitry 815. However, other implementations are possible.

For example, the front end system 803 can provide a number of functionalities, including, but not limited to, amplifying signals for transmission, amplifying received signals, filtering signals, switching between different bands, switching between different power modes, switching between transmission and receiving modes, duplexing of signals, multiplexing of signals (for instance, diplexing or triplexing), or some combination thereof.

In certain implementations, the mobile device 800 supports carrier aggregation, thereby providing flexibility to increase peak data rates. Carrier aggregation can be used for both Frequency Division Duplexing (FDD) and Time Division Duplexing (TDD), and may be used to aggregate a plurality of carriers or channels. Carrier aggregation includes contiguous aggregation, in which contiguous carriers within the same operating frequency band are aggregated. Carrier aggregation can also be non-contiguous, and can include carriers separated in frequency within a common band or in different bands.

The antennas 804 can include antennas used for a wide variety of types of communications. For example, the antennas 804 can include antennas for transmitting and/or receiving signals associated with a wide variety of frequencies and communications standards.

In certain implementations, the antennas 804 support MIMO communications and/or switched diversity communications. For example, MIMO communications use multiple antennas for communicating multiple data streams over a single radio frequency channel. MIMO communications benefit from higher signal to noise ratio, improved coding, and/or reduced signal interference due to spatial multiplexing differences of the radio environment. Switched diversity refers to communications in which a particular antenna is selected for operation at a particular time. For example, a switch can be used to select a particular antenna from a group of antennas based on a variety of factors, such as an observed bit error rate and/or a signal strength indicator.

The mobile device 800 can operate with beamforming in certain implementations. For example, the front end system 803 can include amplifiers having controllable gain and phase shifters having controllable phase to provide beam formation and directivity for transmission and/or reception of signals using the antennas 804. For example, in the context of signal transmission, the amplitude and phases of the transmit signals provided to the antennas 804 are controlled such that radiated signals from the antennas 804 combine using constructive and destructive interference to generate an aggregate transmit signal exhibiting beam-like qualities with more signal strength propagating in a given direction. In the context of signal reception, the amplitude and phases are controlled such that more signal energy is received when the signal is arriving to the antennas 804 from a particular direction. In certain implementations, the antennas 804 include one or more arrays of antenna elements to enhance beamforming.

The baseband system 801 is coupled to the user interface 807 to facilitate processing of various user input and output (I/O), such as voice and data. The baseband system 801 provides the transceiver 802 with digital representations of transmit signals, which the transceiver 802 processes to generate RF signals for transmission. The baseband system 801 also processes digital representations of received signals provided by the transceiver 802. As shown in FIG. 9, the baseband system 801 is coupled to the memory 806 of facilitate operation of the mobile device 800.

The memory 806 can be used for a wide variety of purposes, such as storing data and/or instructions to facilitate the operation of the mobile device 800 and/or to provide storage of user information.

The power management system 805 provides a number of power management functions of the mobile device 800. In certain implementations, the power management system 805 includes a PA supply control circuit that controls the supply voltages of the power amplifiers 811. For example, the power management system 805 can be configured to change the supply voltage(s) provided to one or more of the power amplifiers 811 to improve efficiency, such as power added efficiency (PAE).

As shown in FIG. 9, the power management system 805 receives a battery voltage from the battery 808. The battery 808 can be any suitable battery for use in the mobile device 800, including, for example, a lithium-ion battery.

Applications

Some of the embodiments described above have provided examples in connection with mobile devices. However, the principles and advantages of the embodiments can be used for any other systems or apparatus that have needs for front end systems with enhanced intermodulation distortion (IMD) performance. Examples of such RF communication systems include, but are not limited to, mobile phones, tablets, base stations, network access points, customer-premises equipment (CPE), laptops, and wearable electronics.

CONCLUSION

Unless the context clearly requires otherwise, throughout the description and the claims, the words "comprise," "comprising," and the like are to be construed in an inclusive sense, as opposed to an exclusive or exhaustive sense; that is to say, in the sense of "including, but not limited to." The word "coupled", as generally used herein, refers to two or more elements that may be either directly connected, or connected by way of one or more intermediate elements. Likewise, the word "connected", as generally used herein, refers to two or more elements that may be either directly connected, or connected by way of one or more intermediate elements. Additionally, the words "herein," "above," "below," and words of similar import, when used in this application, shall refer to this application as a whole and not to any particular portions of this application. Where the context permits, words in the above Detailed Description using the singular or plural number may also include the plural or singular number respectively. The word "or" in reference to a list of two or more items, that word covers all of the following interpretations of the word: any of the items in the list, all of the items in the list, and any combination of the items in the list.

Moreover, conditional language used herein, such as, among others, "can," "could," "might," "may," "e.g.," "for example," "such as" and the like, unless specifically stated otherwise, or otherwise understood within the context as used, is generally intended to convey that certain embodiments include, while other embodiments do not include, certain features, elements and/or states. Thus, such conditional language is not generally intended to imply that features, elements and/or states are in any way required for one or more embodiments or that one or more embodiments necessarily include logic for deciding, with or without author input or prompting, whether these features, elements and/or states are included or are to be performed in any particular embodiment.

The above detailed description of embodiments of the invention is not intended to be exhaustive or to limit the invention to the precise form disclosed above. While specific embodiments of, and examples for, the invention are described above for illustrative purposes, various equivalent modifications are possible within the scope of the invention, as those skilled in the relevant art will recognize. For example, while processes or blocks are presented in a given order, alternative embodiments may perform routines having steps, or employ systems having blocks, in a different order, and some processes or blocks may be deleted, moved, added, subdivided, combined, and/or modified. Each of these processes or blocks may be implemented in a variety of different ways. Also, while processes or blocks are at times shown as being performed in series, these processes or blocks may instead be performed in parallel, or may be performed at different times.

The teachings of the invention provided herein can be applied to other systems, not necessarily the system described above. The elements and acts of the various embodiments described above can be combined to provide further embodiments.

While certain embodiments of the inventions have been described, these embodiments have been presented by way of example only, and are not intended to limit the scope of the disclosure. Indeed, the novel methods and systems described herein may be embodied in a variety of other forms; furthermore, various omissions, substitutions and changes in the form of the methods and systems described herein may be made without departing from the spirit of the disclosure. The accompanying claims and their equivalents are intended to cover such forms or modifications as would fall within the scope and spirit of the disclosure.

What is claimed is:

1. A front end system comprising:
a frequency multiplexing circuit;
a band switch configured to selectively provide the frequency multiplexing circuit with a first transmit signal over a first radio frequency signal path and with a second transmit signal over a second radio frequency signal path;
a first switched termination circuit in shunt with the first radio frequency signal path and operable to turn on to suppress impedance variation when the first radio frequency signal path is inactive, the first switched termination circuit including a shunt switch and a termination resistor electrically connected in series; and
a decoupling switch electrically connected between an output terminal of the band switch and the shunt switch.

2. The front end system of claim 1 further comprising a second switched termination circuit in shunt with the second radio frequency signal path and operable to turn on to suppress impedance variation when the second radio frequency signal path is inactive.

3. The front end system of claim 1 further comprising an antenna switch coupled to the frequency multiplexing circuit at a node, the first switched termination circuit operable to maintain impedance matching at the node over a signal frequency range of the first transmit signal.

4. The front end system of claim 1 wherein the frequency multiplexing circuit is further configured to output a first receive signal and a second receive signal.

5. The front end system of claim 1 wherein the frequency multiplexing circuit includes at least one duplexer.

6. The front end system of claim 1 wherein the termination resistor has a resistance of about fifty ohms.

7. The front end system of claim 1 wherein the band switch is further configured to selectively provide the frequency multiplexing circuit with a third transmit signal over a third radio frequency signal path.

8. The front end system of claim 1 further comprising a power amplifier configured to provide the band switch with the first transmit signal and the second transmit signal at an input terminal to the band switch.

9. The front end system of claim 1 further comprising a grounding switch electrically connected between the output terminal of the band switch and ground.

10. A mobile device comprising:
a transceiver configured to generate at least one radio frequency signal; and
a front end system configured to process the at least one radio frequency signal from the transceiver to generate a first transmit signal and a second transmit signal, the front end system including a frequency multiplexing circuit and a band switch configured to selectively provide the frequency multiplexing circuit with the first transmit signal over a first radio frequency signal path and with the second transmit signal over a second radio frequency signal path, the front end system further including a first switched termination circuit in shunt with the first radio frequency signal path and operable to turn on to suppress impedance variation when the first radio frequency signal path is inactive, the first switched termination circuit including a shunt switch and a termination resistor electrically connected in series, the front end system further including a decoupling switch electrically connected between an output terminal of the band switch and the shunt switch.

11. The mobile device of claim 10 wherein the front end system further includes a second switched termination circuit in shunt with the second radio frequency signal path and operable to turn on to suppress impedance variation when the second radio frequency signal path is inactive.

12. The mobile device of claim 10 wherein the front end system further includes an antenna switch coupled to the frequency multiplexing circuit at a node, the first switched termination circuit operable to maintain impedance matching at the node over a signal frequency range of the first transmit signal.

13. The mobile device of claim 12 further comprising a first antenna, the antenna switch operable to selectively connect the node to the first antenna.

14. The mobile device of claim 10 wherein the front end system further includes at least one power amplifier configured to generate the first transmit signal and the second transmit signal.

15. The mobile device of claim 10 wherein the front end system further includes a grounding switch electrically connected between the output terminal of the band switch and ground.

16. A method of radio frequency signal communication, the method comprising:
controlling a state of a band switch to provide a first transmit signal to a frequency multiplexing circuit over a first radio frequency signal path;
changing the state of the band switch to deactivate the first radio frequency signal path and to provide a second transmit signal to the frequency multiplexing circuit over a second radio frequency signal path;
turning on a first switched termination circuit in shunt to the first radio frequency signal path to suppress impedance variation when the first radio frequency signal path is deactivated, the first switched termination circuit including a shunt switch in series with a termination resistor; and
decoupling an output terminal of the band switch from the shunt switch using a decoupling switch.

17. The method of claim 16 further comprising maintaining impedance matching at a node between the frequency multiplexing circuit and an antenna switch over a signal frequency range of the first transmit signal.

18. The method of claim 16 further comprising selectively grounding the output terminal of the band switch using a grounding switch.

19. The method of claim 16 further comprising transmitting the first transmit signal on an antenna.

20. The method of claim 19 wherein the frequency multiplexing circuit includes a duplexer, the method further comprising receiving a receive signal on the antenna, and providing the receive signal from the antenna to a receive path through the duplexer.

* * * * *